(12) United States Patent
Tanaka et al.

(10) Patent No.: US 11,039,124 B2
(45) Date of Patent: Jun. 15, 2021

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Kayoko Tanaka, Tokyo (JP); Kazuma Aiki, Tokyo (JP); Hiroshi Yuasa, Kanagawa (JP); Satoshi Nakano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/758,674

(22) PCT Filed: Dec. 13, 2018

(86) PCT No.: PCT/JP2018/045816
§ 371 (c)(1),
(2) Date: Apr. 23, 2020

(87) PCT Pub. No.: WO2019/131160
PCT Pub. Date: Jul. 4, 2019

(65) Prior Publication Data
US 2020/0359008 A1    Nov. 12, 2020

(30) Foreign Application Priority Data
Dec. 27, 2017    (JP) .............................. JP2017-250651

(51) Int. Cl.
*H04N 13/398*    (2018.01)
*H04N 13/344*    (2018.01)
(52) U.S. Cl.
CPC ......... *H04N 13/398* (2018.05); *H04N 13/344* (2018.05)

(58) Field of Classification Search
None
See application file for complete search history.

(56) References Cited

U.S. PATENT DOCUMENTS

| 5,233,458 A | 8/1993 | Moffitt et al. |
|---|---|---|
| 2006/0012759 A1 | 1/2006 | Matsushita |

(Continued)

FOREIGN PATENT DOCUMENTS

| JP | H05-316541 A | 11/1993 |
|---|---|---|
| JP | H07-095621 A | 4/1995 |

(Continued)

*Primary Examiner* — Talha M Nawaz
(74) *Attorney, Agent, or Firm* — Paratus Law Group, PLLC

(57) ABSTRACT

There is provided an information processing apparatus capable of presenting an object that is easy to be in a fusion state where connection is natural regardless of a distance, an information processing method, and a recording medium. In the information processing apparatus, a left-eye image and a right-eye image are output to acquire position information of an object in a depth direction to be perceived by a user, and a luminance correction region to be subjected to luminance correction is set to at least one of a first display region that is included in a display region for the left-eye image and overlaps a display region for the right-eye image, or a second display region that is included in the display region for the right-eye image and overlaps the display region for the left-eye image on the basis of the position information. The present technology can be applied to, for example, a transmissive HMD.

20 Claims, 32 Drawing Sheets

(56) References Cited

U.S. PATENT DOCUMENTS

| | | | | |
|---|---|---|---|---|
| 2008/0316355 A1* | 12/2008 | Fukugawa | ............ | H04N 5/2351 348/364 |
| 2013/0147797 A1* | 6/2013 | Tanaka | .................... | G06T 15/00 345/419 |
| 2013/0181984 A1* | 7/2013 | Chen | .................... | H04N 13/111 345/419 |

FOREIGN PATENT DOCUMENTS

| | | | |
|---|---|---|---|
| JP | 2006-246551 | A | 9/2006 |
| JP | 2008-033891 | A | 2/2008 |
| JP | 2015-149634 | A | 8/2015 |
| JP | 2016-130771 | A | 7/2016 |
| JP | 2017-212720 | A | 11/2017 |
| JP | 2017-215688 | A | 12/2017 |
| WO | WO 2017/115505 | A1 | 7/2017 |

* cited by examiner

FIG. 3
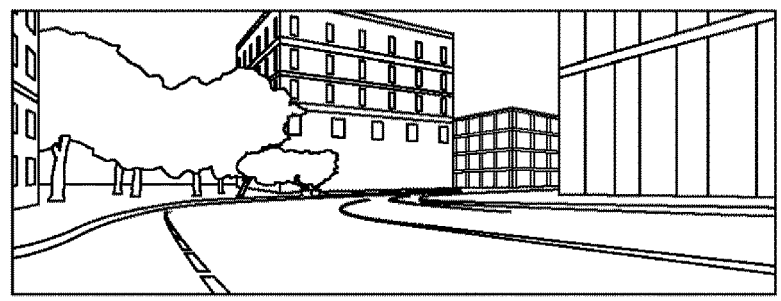
A
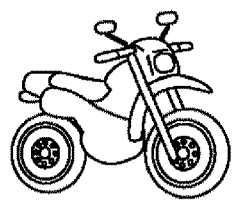
B
O
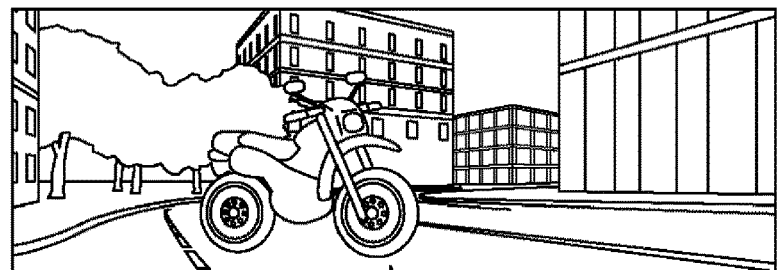
C
O

FIG. 4
A
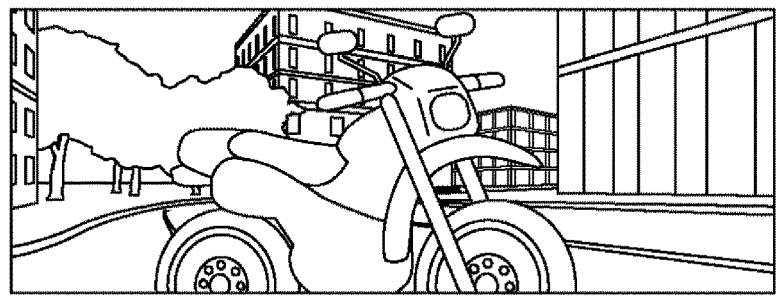
O
B
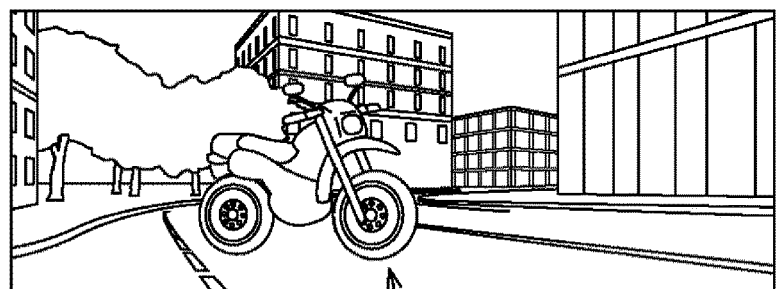
O
C
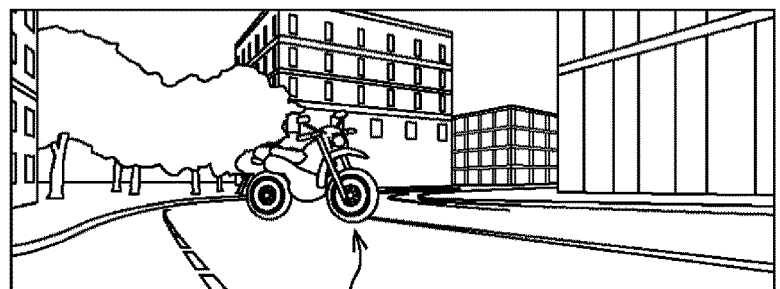
O

FIG. 14
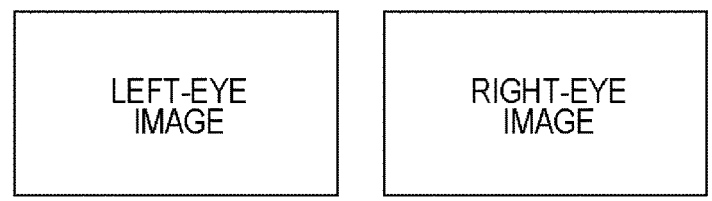
LUMINANCE CORRECTION
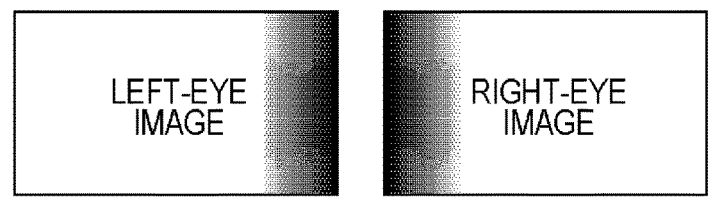
DISTORTION CORRECTION
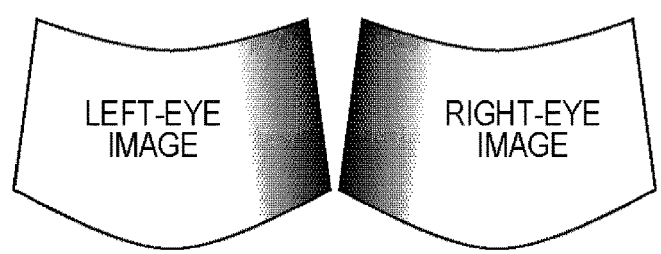

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2018/045816 (filed on Dec. 13, 2018) under 35 U.S.C. § 371, which claims priority to Japanese Patent Application No. 2017-250651 (filed on Dec. 27, 2017), which are all hereby incorporated by reference in their entirety.

TECHNICAL FIELD

The present technology relates to an information processing apparatus, an information processing method, and a recording medium, and in particular, to an information processing apparatus capable of presenting an object that is easy to be in a fusion state where connection is natural regardless of a distance, an information processing method, and a recording medium.

BACKGROUND ART

There is a head mounted display (HMD) provided with respective displays for the left eye and the right eye. In a case where an offset is set in the image displayed on the left-eye display and the image displayed on the right-eye display, a user can stereoscopically view the object included in the image due to the parallax between both eyes.

Patent Document 1 discloses a technology of tilting each of a left-eye optical system and a right-eye optical system arranged in front of a user's eye outward for the purpose of securing a wide viewing angle.

In order to fuse the object without difficulty, it is necessary to devise arrangements of devices constituting the optical system and image processing. For example, there is a technology of applying luminance correction to a certain range of each end of the left-eye image and the right-eye image to fuse the object in a natural form.

CITATION LIST

Patent Document

Patent Document 1: Japanese Patent Application Laid-Open No. 2013-25101

SUMMARY OF THE INVENTION

Problems to be Solved by the Invention

In a case of presenting objects at different distances, if the range of luminance correction is a fixed range regardless of the presentation distance, fusion and image quality may be affected.

The present technology has been made in view of such a situation, and is intended to be able to present an object that is easily in a fusion state where connection is natural regardless of a distance.

Solutions to Problems

An information processing apparatus according to an aspect of the present technology includes an acquisition unit that outputs a left-eye image and a right-eye image to acquire position information of an object in a depth direction to be perceived by a user; and a control unit that sets a luminance correction region to be subjected to luminance correction to at least one of a first display region that is included is a display region for the left-eye image and overlaps a display region for the right-eye image, or a second display region that is included in the display region for the right-eye image and overlaps the display region for the left-eye image on the basis of the position information.

In an aspect of the present technology, a left-eye image and a right-eye image are output to acquire position information of an object in a depth direction to be perceived by a user and a luminance correction region to be subjected to luminance correction is set to at least one of a first display region that is included in a display region for the left-eye image and overlaps a display region for the right-eye image, or a second display region that is included in the display region for the right-eye image and overlaps the display region for the left-eye image on the basis of the position information.

Effects of the Invention

According to the present technology, it is possible to present as object that is easy to be in a fusion state where connection is natural regardless of a distance.

Note that the effects described herein are not necessarily limited, and any of the effects described in the present disclosure may be applied.

BRIEF DESCRIPTION OF DRAWINGS

FIG. 3 is a diagram showing a display example of content.

FIG. 4 is a diagram showing another example of appearance of an object.

FIG. 14 is a diagram showing an example of processing for a left-eye image and a right-eye image.

MODE FOR CARRYING OUT THE INVENTION

Hereinafter, embodiments for carrying out the present technology will be described. The description will be given in the following order.
1. First embodiment for luminance correction (shading)
2. Second embodiment for display of an auxiliary image In the vicinity of the boundary between the binocular vision region and the monocular vision region, a phenomenon in which a part of a video image in the monocular vision region side appears to be transparent or a phenomenon called Luning in which a dark band is seen may occur due to visual field conflict. In order to suppress these phenomena, there is known a method of displaying an auxiliary image which is a linear image near a boundary. A technology of suppressing Luning by displaying an auxiliary image is employed in, for example, an HMD of a military aircraft, and the like.

First Embodiment for Luminance Correction (Shading)

Figure 1:
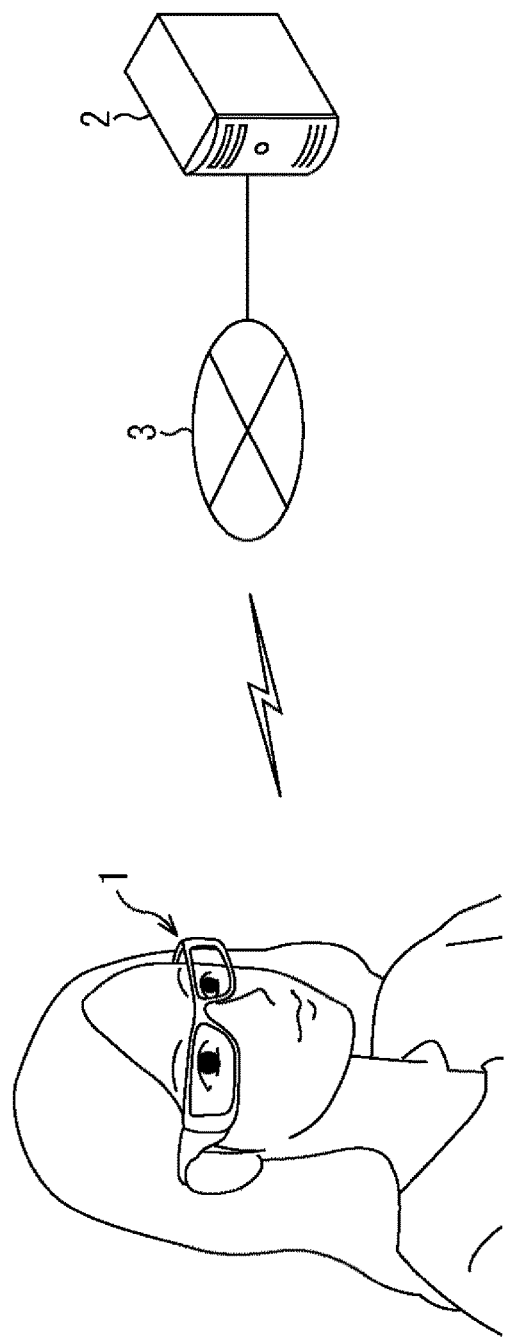
FIG. 1 is a diagram showing a configuration example of an information processing system according to an embodiment of the present technology.

FIG. 1 is a diagram showing a configuration example of an information processing system according to an embodiment of the present technology.

The information processing system of FIG. 1 is configured by connecting an HMD 1 and a content distribution server 2 via a network 3 such as the Internet.

As shown in FIG. 1, the HMD 1 is a glasses-type wearable terminal provided with a transmissive display device. The HMD 1 communicates with the content distribution server 2 via the network 3, and receives the content transmitted from the content distribution server 2. The HMD 1 reproduces content and displays an image including various objects on a display device. A user sees the object over the scene in front of him/her.

The projection method of the image including the object may be a virtual image projection method or a retinal projection method of directly forming an image on the retina of the user's eye.

The content reproduced by the HMD 1 is not limited to the content transmitted from the content distribution server 2. For example, the content stored in a memory mounted on the HMD 1 is reproduced on the HMD 1. Furthermore, content stored in a mobile terminal such as a smartphone or a tablet terminal carried by the user or content stored in a PC may be acquired by the HMD 1 and reproduced.

<Content Projection Method>

Figure 2:
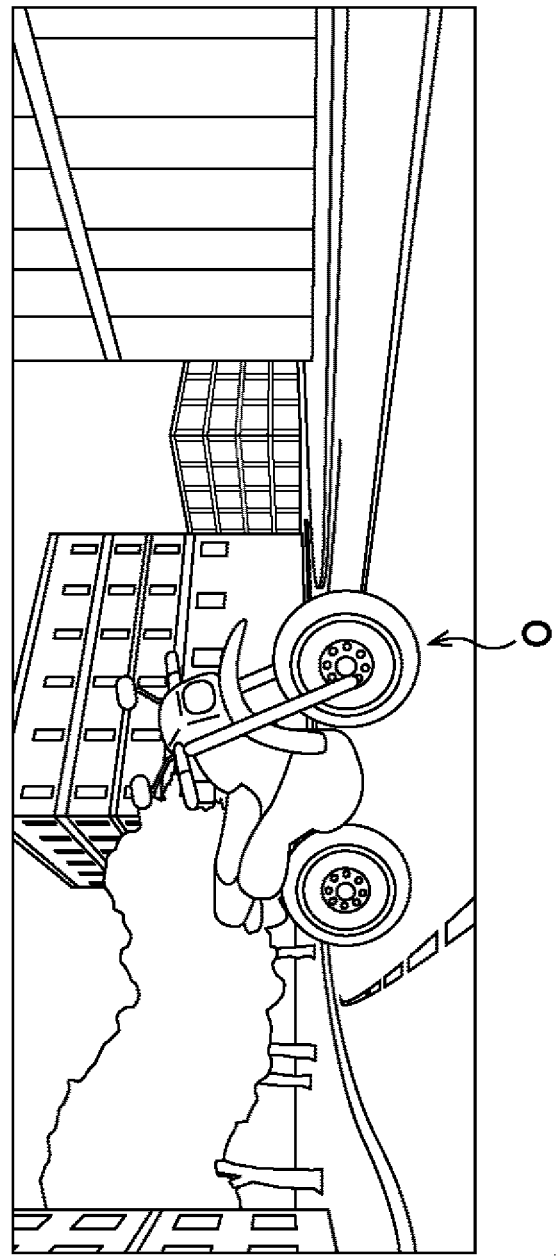
FIG. 2 is a diagram showing an example of appearance of an object.

FIG. 2 is a diagram showing an example of appearance of an object.

The range of the horizontally-long rectangle shown in FIG. 2 indicates a range in which various types of information can be displayed in an overlapping manner by the HMD 1 in the range of the scene actually seen by the user. In practice, the user sees the scene larger than the range shown in FIG. 2.

In the example of FIG. 2, an object O, which is an image of a motorcycle, is presented over the scene in front of the user. The object O may be a two-dimensional image or a three-dimensional image that can be seen stereoscopically.

FIG. 3 is a diagram showing a display example of content for realizing the appearance of the scene as shown in FIG. 2.

A of FIG. 3 shows the scene that can be seen in front of the user. In the example of A of FIG. 3, the user is viewing the scene where buildings are lined up on the left and right across the road.

An image including the object O as shown in B of FIG. 3 is displayed over such scene, and as shown in C of FIG. 3, the appearance that the object O exists in front of the scene same as FIG. 2 is achieved. In the image shown in B of FIG. 3, a portion other than the portion where the object O is displayed is a portion having a high transparency (a portion where the scene is viewed as completely transparent as compared with a portion where the image exists in the appearance of the screen).

The HMD 1 presents such an object by setting the presentation distance to various distances. The presentation distance is the distance in the depth direction perceived by the user from the position of the eye to the position of the object.

FIG. 4 is a diagram showing another example of appearance of an object.

A of FIG. 4 shows appearance of the object O in a case where the presentation distance is short. For example, the presentation distance of the object O in A of FIG. 4 is 30 cm. In a case where the presentation distance is short, the object O is displayed so as to occupy a wide range as shown in A of FIG. 4.

B of FIG. 4 shows the appearance of the object O in a case where the presentation distance is, for example, 2 m, and C of FIG. 4 shows the appearance of the object O in a case where the presentation distance is, for example, 10 m. As shown in B of FIG. 4 and C of FIG. 4, the object O of a size that varies according to the presentation distance is displayed.

Such an object is presented by delivering a left-eye image, which is an image for the left eye, to the user's left eye, and delivering a right-eye image, which is an image for the right eye, to the user's right eye. The HMD 1 is provided with a display unit for displaying the left-eye image and a display unit for displaying the right-eye image.

Figure 5:
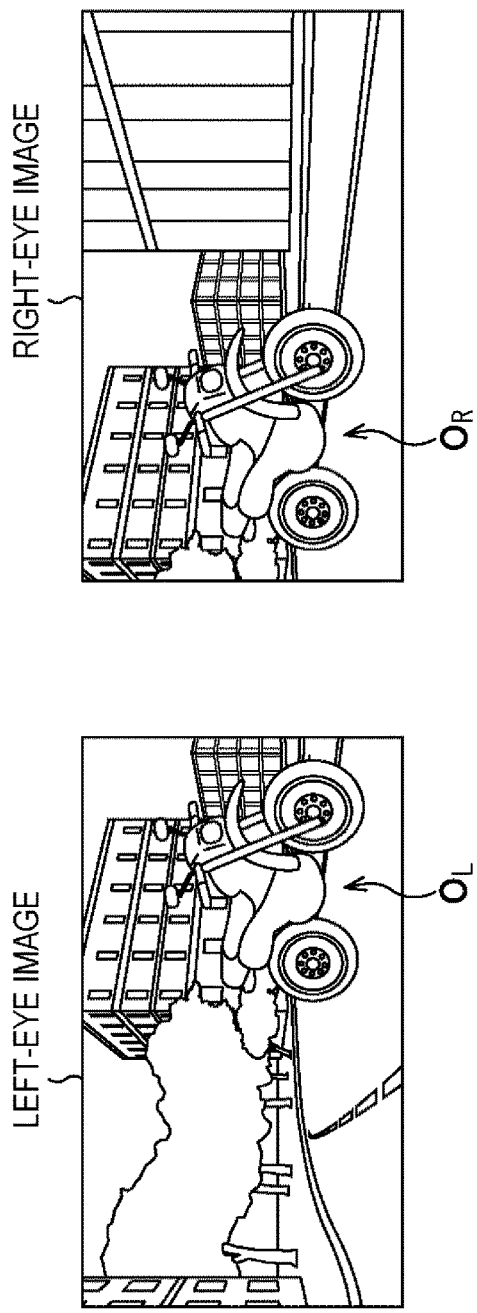
FIG. 5 is a diagram showing an example of a left-eye image and a right-eye image.

FIG. 5 is a diagram showing an example of the left-eye image and the right-eye image.

In the example of FIG. 5, the scene in front of the user is shown in the background of the object for convenience of explanation. The difference in the range of each scene indicates that the left-eye image and the right-eye image are images with assumption of a viewing angle that varies according to the parallax. The range of the scene included in the left-eye image and the range of the scene included in the right-eye image partially overlap.

The position of the object $O_L$ in the left-eye image and the position of the object $O_R$ in the right-eye image also vary according to the parallax.

Figure 6:
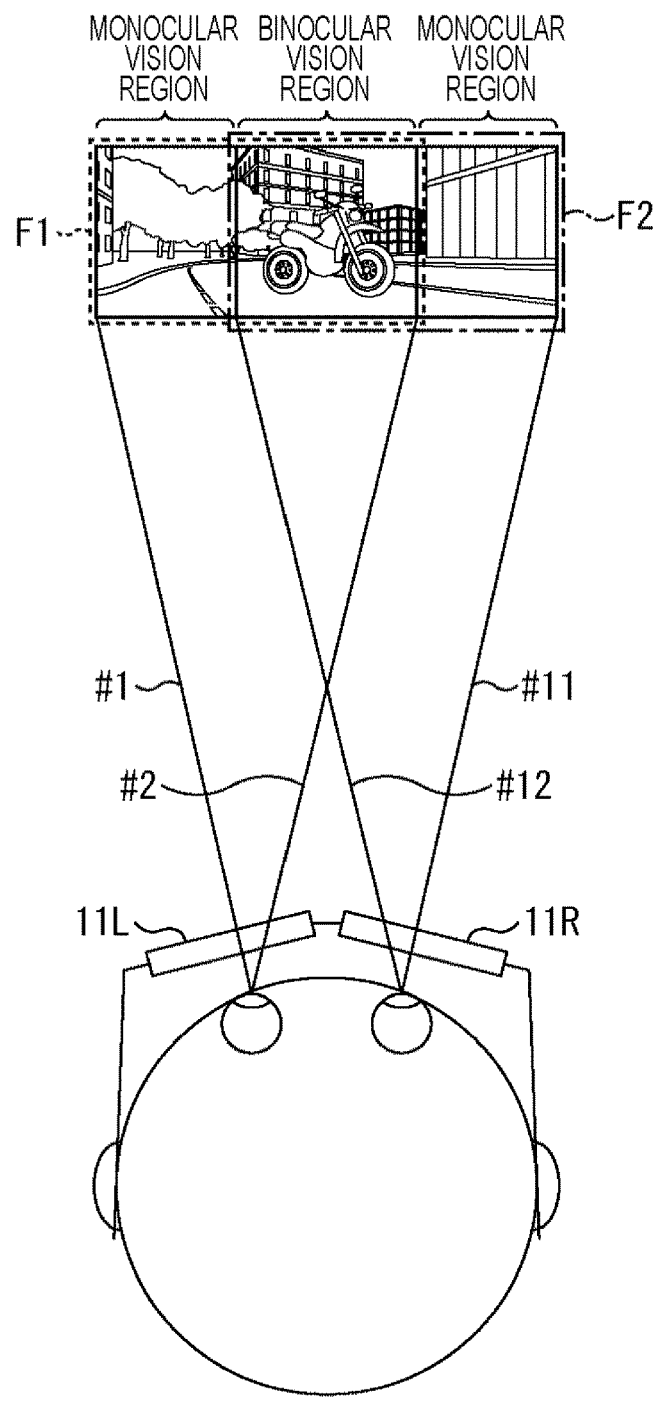
FIG. 6 is a plan view schematically showing a display method of an HMD.

FIG. 6 is a plan view schematically showing the display method of the HMD 1.

As shown in FIG. 6, a left-eye optical system 11L that guides the front scene and the left-eye image to the left eye, and a right-eye optical system 11R that guides the front scene and the right-eye image to the right eye are provided at a predetermined angle so as to face outward with respect to a vertical line passing through the centers of both eyes of the user. As described later, the left-eye optical system 11L and the right-eye optical system 11R include a display unit for displaying the left-eye image and a display unit for displaying the right-eye image, respectively.

As shown by straight lines #1 and #2, the left-eye image shown by surrounding by a broken-line frame F1 is guided to the left eye of the user. Furthermore, as shown by straight lines #11 and #12, the right-eye image shown by surrounding by the dashed-dotted line frame F2 is guided to the right eye of the user.

A region where the region of the left-eye image and the region of the right-eye image overlap with each other is a binocular vision region where the display content is guided to both eyes. Furthermore, a region other than the binocular vision region of the region of the left-eye image and the region of the right-eye image is a monocular vision region in which display content is guided to one eye. In the left-eye image, the binocular vision region, which is the region where the right-eye image and the display region overlap with each other, is formed on the right side of the entire display region, and in the right-eye image, the binocular vision region where the left-eye image and the display region overlap each other is formed on the left side of the entire display region.

As described above, by setting parallax between the left-eye image and the right-eye image and displaying the left-eye image and the right-eye image so as to overlap with each other in some regions, a large viewing angle can be secured as compared with the case where similar images are displayed on the left and right.

Here, the case where the image of the motorcycle is presented has been described, but the HMD 1 can present the user with various images other than the image of the motorcycle as objects. Furthermore, the HMD 1 can simultaneously present a plurality of objects to a user by displaying an image including a plurality of objects.

<Luminance Correction>

In the HMD 1, in order for an object included in the left-eye image and an object included in the right-eye image to be recognized as being naturally connected, luminance correction processing so-called shading is applied to each image.

Figure 7:
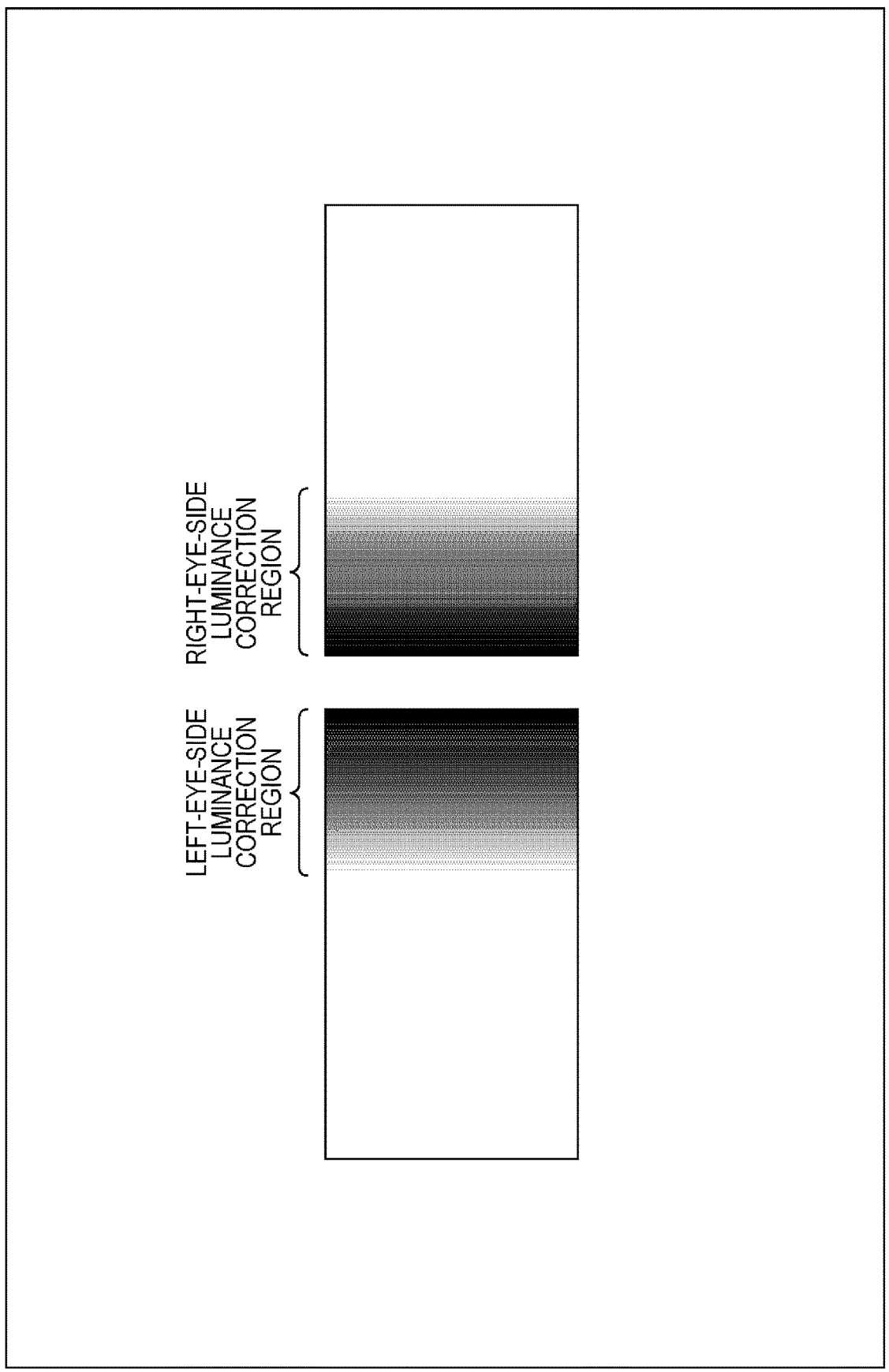
FIG. 7 is a diagram showing an example of a luminance correction pattern.

FIG. 7 is a diagram showing an example of a luminance correction pattern.

As shown in FIG. 7, a region having a predetermined width from the right end of the left-eye image is set as a left-eye-side luminance correction region. Luminance correction processing is applied to the left-eye image according to a gradation-like luminance correction pattern so that the luminance gradually decreases as approaching the right end. FIG. 7 represents that processing is applied such that the luminance of the image in a part is lower (the transparency is higher) as the part has darker color.

Similarly, a region having a predetermined width from the left end of the right-eye image is set as a right-eye-side luminance correction region. Luminance correction processing is applied to the right-eye image according to a gradation-like luminance correction pattern so that the luminance gradually decreases as approaching the left end. In the example of FIG. 7, the width of the left-eye-side luminance correction region is the same as the width of the right-eye-side luminance correction region.

Figure 8:
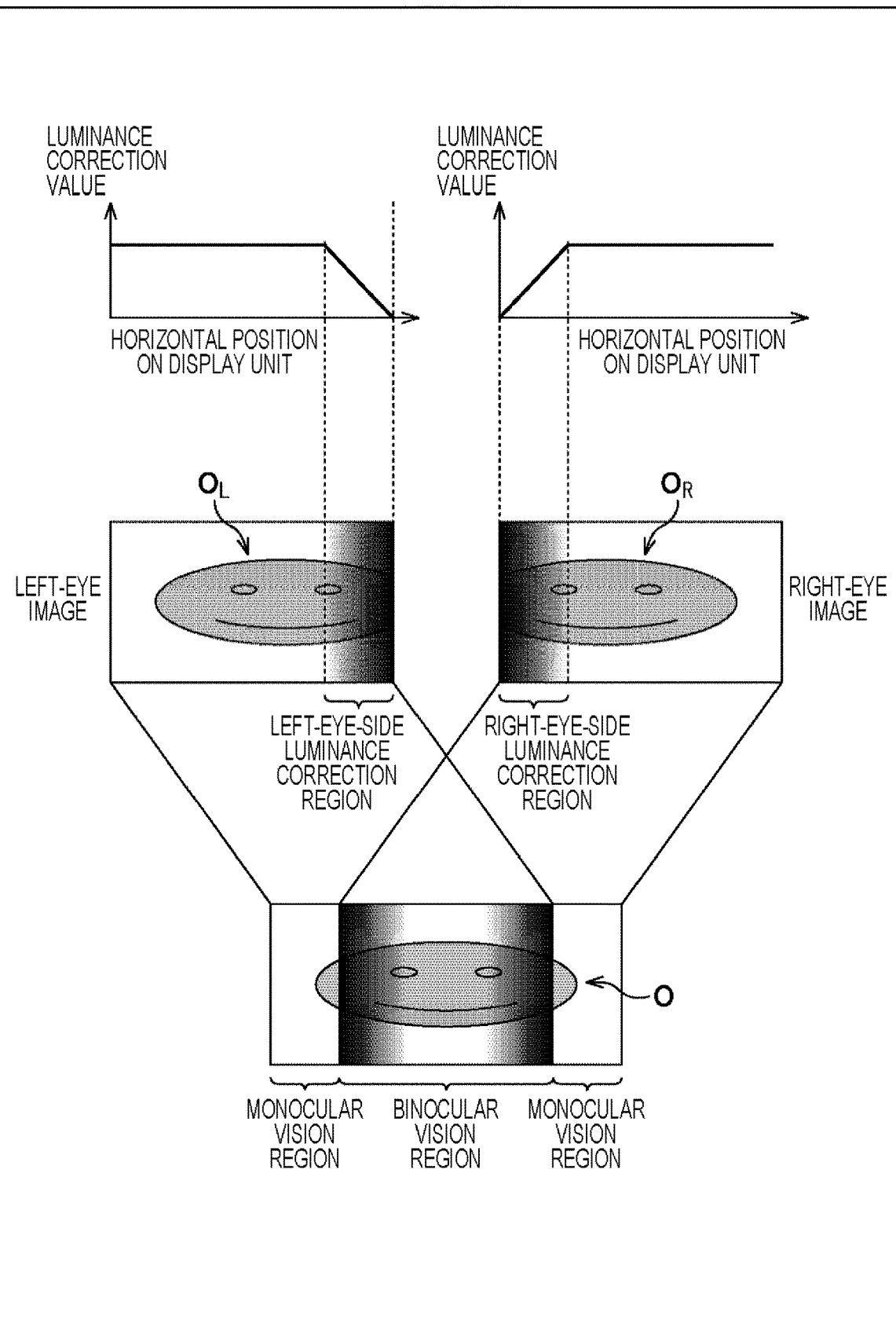
FIG. 8 is a diagram showing an example of luminance correction processing.

FIG. 8 is a diagram showing an example of luminance correction processing.

The graph shown in the upper part of FIG. 8 is a graph showing a change in luminance in a case where the luminance correction is performed using the luminance correction pattern of FIG. 7. The vertical axis indicates the luminance correction value, and the horizontal axis indicates the horizontal position on the display unit (on the image).

In the example of FIG. 8, it is assumed that the luminance correction pattern is used in which the luminance decreases linearly toward the end of the image. However, a luminance correction pattern in which the luminance decreases stepwise or a luminance correction pattern in which the luminance decreases in a curved line may be used.

By performing luminance correction using such a luminance correction pattern, the left-eye image and the right-eye image after luminance correction as shown in the middle part of FIG. 8 are generated.

As shown in the left-eye image after the luminance correction, the portion of the object $O_L$ in the luminance correction region is in a state where the luminance gradually decreases as approaching the right end. In the example of FIG. 8, the object is an image of an illustration representing a human face. Furthermore, as shown in the right-eye image after the luminance correction, the luminance of the portion of the luminance correction region of the object $O_R$ gradually decreases as approaching the left end.

The left-eye image after the luminance correction is displayed on the display unit provided in the left-eye optical system 11L, and the right-eye image is displayed on the display unit provided in the right-eye optical system 11R so that the object O whose luminance has been corrected at both ends of the binocular vision region as shown in the lower part of FIG. 8 presented.

The lower part of FIG. 8 shows the state of the object O recognized by the user. In a case where the binocular vision region of the left-eye image and the binocular vision region of the right-eye image are shown in an overlapping manner, the position of the left-eye-side luminance correction region is the position in the binocular vision region of the left-eye image (the position inside the binocular vision region) with reference to the boundary between the right end of the left-eye image and the right-eye image. Furthermore, the position of the right-eye-side luminance correction region is a position in the binocular vision region of the right-eye image with reference to the boundary between the left end of the right-eye image and the left-eye image.

By displaying the left-eye image and the right-eye image in which the luminance difference at the boundary portion is suppressed by performing the luminance correction, the objects on the two images can be appropriately fused to the user's eyes, and the object can be recognized in a natural way. Here, fusion refers to a function of fusing images reflected on the left and right retinas and recognizing them as one image.

As described above, in the HMD 1, the presentation of the object is performed with the presentation distance set to various distances. Luminance correction patterns used for luminance correction of the left-eye image and the right-eye image are switched according to the presentation distance of the object.

Example of Linearly Changing the Width of the Luminance Correction Region

Figure 9:
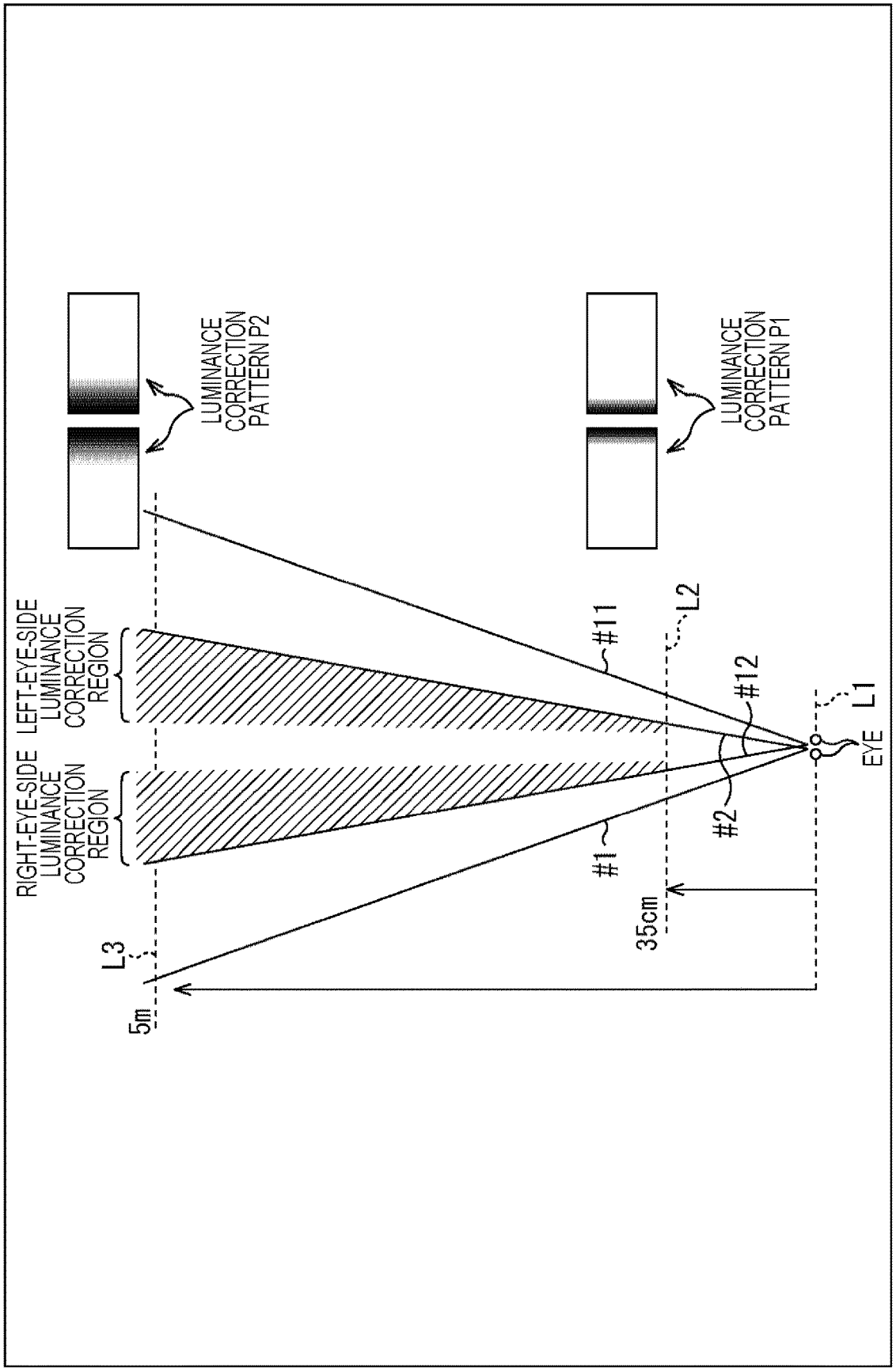
FIG. 9 is a diagram showing an example of a change in a luminance correction pattern according to a presentation distance of an object.

FIG. 9 is a diagram showing an example of a change in a luminance correction pattern according to a presentation distance of an object.

A broken line L1 shown in the lower part of FIG. 9 indicates the position of the user's eye as a reference for the presentation distance. A broken line L2 indicates a position in a case of assuming an object presentation distance of 35 cm, and a broken line 13 indicates a position in a case of assuming an object presentation distance of 5 m.

As described above, the range between the straight lines #1 and #2 corresponds to the range of light reaching the left eye of the user (the range of the left-eye image), and the range between the straight lines #11 and #12 corresponds to the range of light reaching the right eye of the user (the range of the right-eye image). A left-eye-side luminance correction region is set at the right end of the left-eye image, and a right-eye luminance correction region is set at the left end of the right-eye image.

As shown by hatching, the left-eye-side luminance correction region set at the right end of the left-eye image is set as a larger width (angle) region as the presentation distance of the object is longer. Furthermore, the right-eye-side luminance correction region set at the left end of the right-eye image is set as a larger width region as the presentation distance of the object is longer. In the example of FIG. 9, the width of the luminance correction region changes linearly in the range of the presentation distance from 35 cm to 5 m.

The luminance correction pattern P1 shown on the right side of FIG. 9 shows a luminance correction pattern in a case where the presentation distance is 35 cm. The luminance correction pattern P2 shows a luminance correction pattern in a case where the presentation distance is 5 m. As can be seen from the luminance correction pattern P1 and the luminance correction pattern P2, in a case where the presentation distance of the object is 5 m, the luminance correction is performed in a larger range than in a case where the presentation distance is 35 cm.

In a case where the width of the luminance correction region is constant regardless of the presentation distance of the object, when the presentation distance is short, the difference between the left and right images increases due to the luminance correction region being too large with respect to the binocular vision region, and therefore the fusion may be disturbed. By changing the width of the luminance correction region according to the presentation distance of the object, the HMD 1 can appropriately perform fusion even in a case where the presentation distance of the object is short.

Example of Changing the Width of the Luminance Correction Region Stepwise

Figure 10:
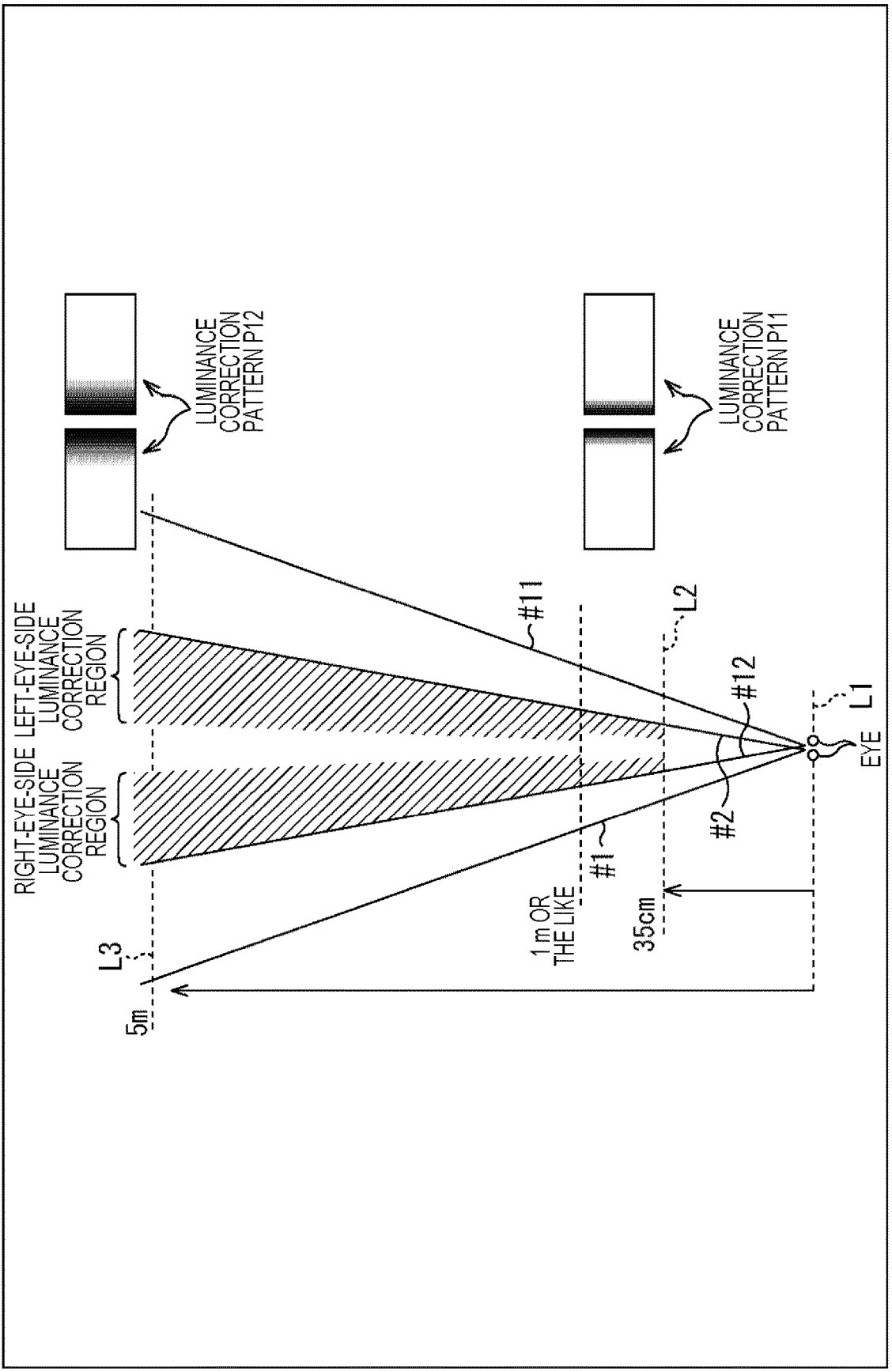
FIG. 10 is a diagram showing another example of a change in a luminance correction pattern according to a presentation distance of an object.

FIG. 10 is a diagram showing another example of a change in a luminance correction pattern according to a presentation distance of an object.

In the example of FIG. 10, it is assumed that the width of the luminance correction region changes stepwise according to the presentation distance of the object.

For example, in a range where the presentation distance of the object is 35 cm or more and less than 1 m, the width of the luminance correction region changes linearly. A luminance correction pattern P11 used in a case where the presentation distance of the object is 35 cm is, for example, a luminance correction pattern in which a region having a smaller width than the luminance correction pattern P1 in FIG. 9 is used as the luminance correction region.

In a case where the presentation distance of the object is 1 m, a region having a width that is discontinuous with a change in the width of the luminance correction region in a range of the presentation distance of 35 cm or more and less than 1 m is set as the luminance correction region. In the range of the presentation distance from 1 m to 5 m, the width of the luminance correction region linearly changes. A luminance correction pattern P12 used in a case where the presentation distance of the object is 5 m is, for example, a luminance correction pattern in which a region having the same width as the luminance correction pattern P2 in FIG. 9 is used as the luminance correction region.

As described above, it is also possible to switch the widths of the luminance correction region in two steps of less than 1 m in which fusion generally becomes difficult, and equal to or larger than 1 m. The presentation distance at which the change in the width of the luminance correction region is discontinuous may be a distance other than 1 m. Furthermore, the width of the luminance correction region may be set to have three or more steps of change.

Figure 11:
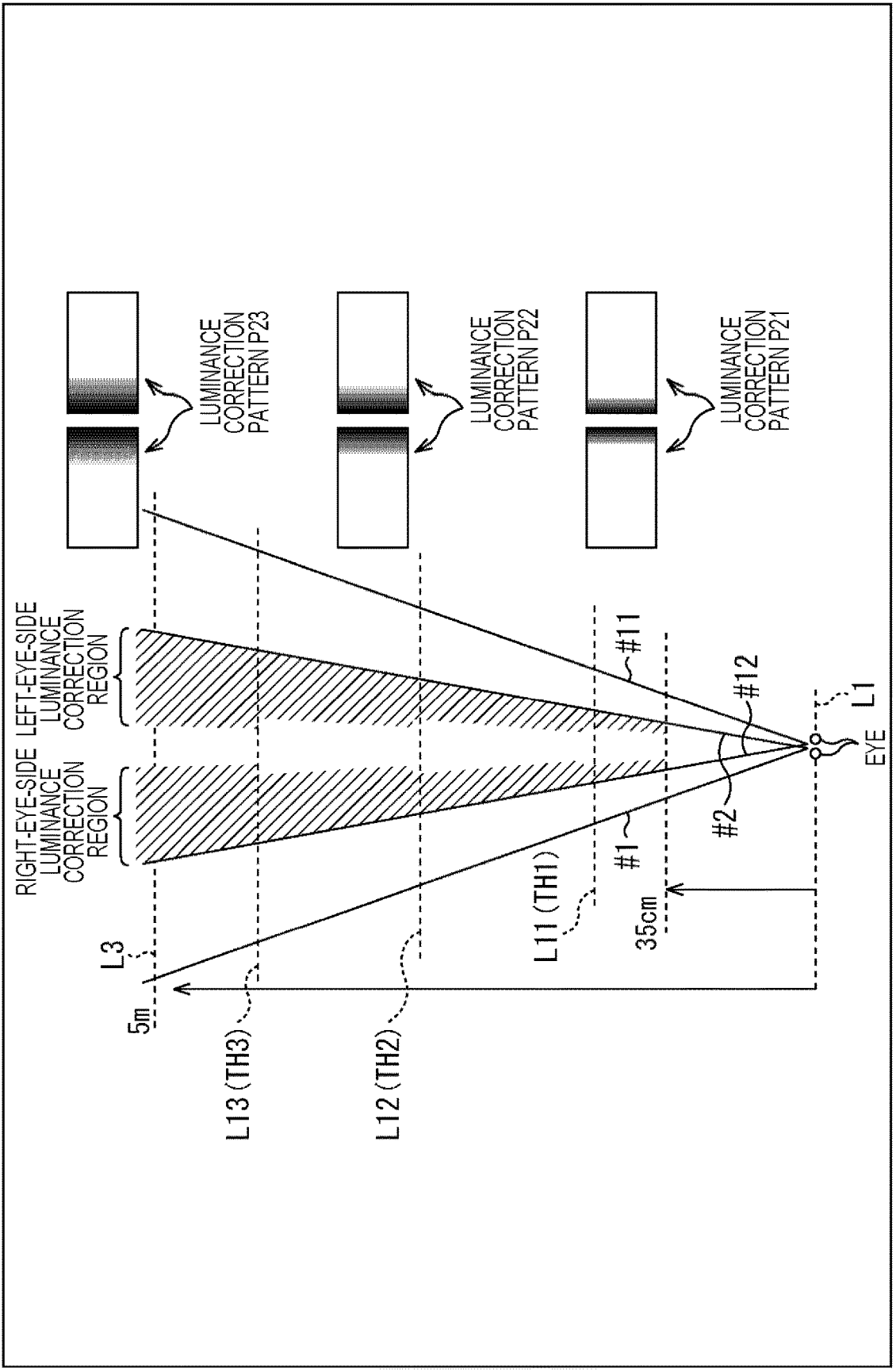
FIG. 11 is a diagram showing another example of a change in a luminance correction pattern according to a presentation distance of an object.

FIG. 11 is a diagram showing another example of a change in a luminance correction pattern according to a presentation distance of an object.

In the example of FIG. 11, at each of presentation distances of the object of a threshold TH1 indicated by a broken line L11, a threshold TH2 indicated by a broken line L12, and a threshold TH3 indicated by a broken line L13, the width of the luminance correction region changes stepwise.

As described above, the HMD 1 can change the width of the luminance correction region stepwise at various presentation distances. For example, the widths of the luminance correction region may be switched stepwise at each of the presentation distances of the object of 35 cm, 50 cm, 75 cm, 1 m, and 2 m. Moreover, the widths of the luminance correction region may be switched using a combination of predetermined presentation distances such as distances of 35 cm, 50 cm, 1 m, and 2 m, and distances of 35 cm, 50 cm, and 2 m.

In a case where the presentation distance of the object is 2 m or more, the convergence angle of the user's eyes does not change significantly, and therefore, the width of the luminance correction region may be set as a constant width. The convergence angle is an angle formed by a straight line connecting the left eye and the object and a straight line connecting the right eye and the object.

Furthermore, the convergence angle of the user's eye may be monitored, and the widths of the luminance correction region may be switched according to the monitoring value.

For example, the widths of the luminance correction region can be switched between a case where the convergence angle is 5 degrees or more and a case where the convergence angle is less than 5 degrees.

Moreover, the widths of the luminance correction region may be switched according to the setting of the user. In this case, for example, processing of presenting the object causing the object to gradually approach the user and allowing the user to set a distance at which the fusion becomes difficult is performed as the initial setting. In a case where the object is actually presented, information recorded at the time of the initial setting is referred to, and the widths of the luminance correction region are switched stepwise before and after the presentation distance set by the user.

As described above, it is possible to set the luminance correction region by various methods.

<Configuration of HMD>

Figure 12:
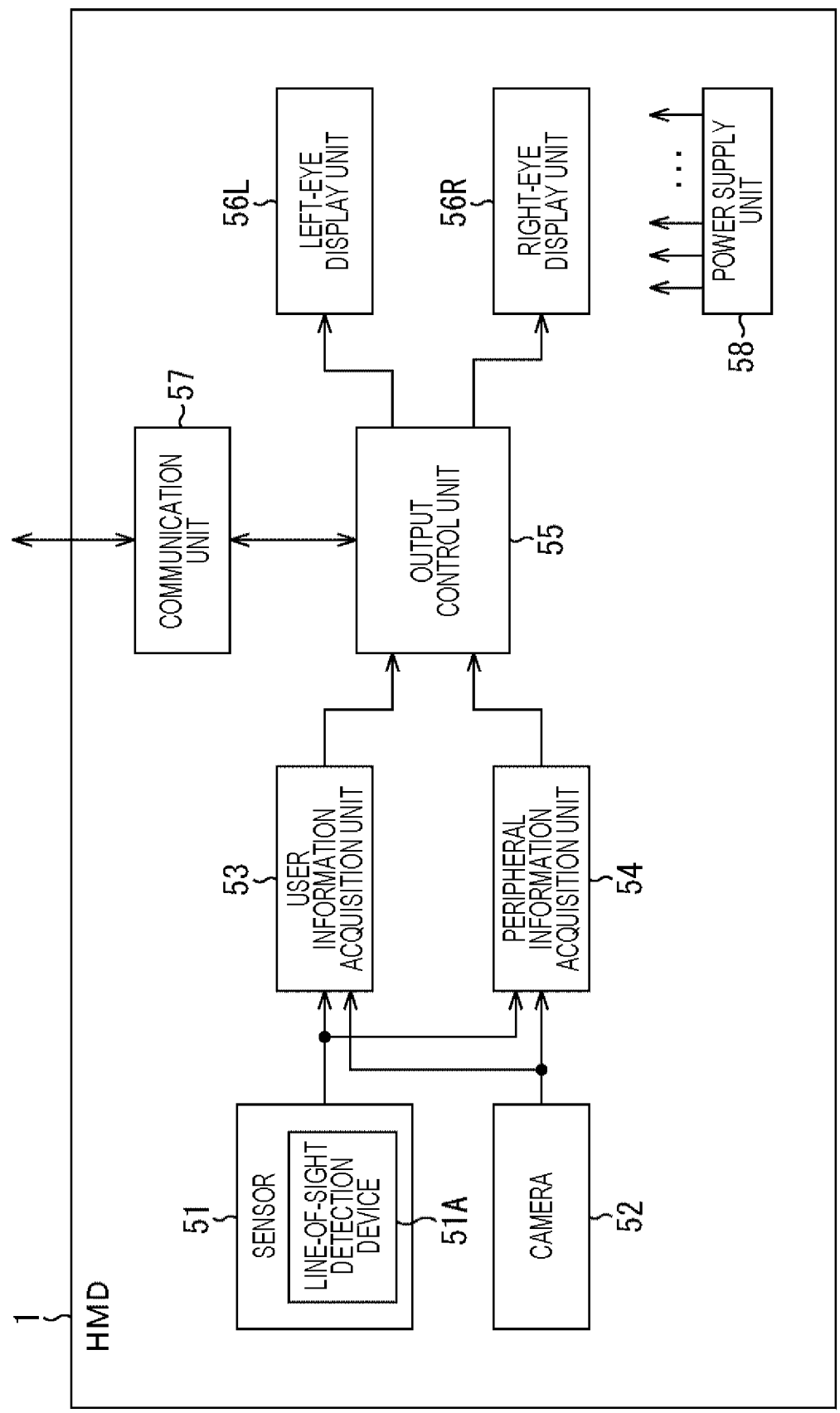
FIG. 12 is a block diagram showing a configuration example of the HMD.

FIG. 12 is a block diagram showing a configuration example of the HMD 1.

As shown in FIG. 12, the HMD 1 includes a sensor 51, a camera 52, a user information acquisition unit 53, a peripheral information acquisition unit 54, an output control unit 55, a left-eye display unit 56L, a right-eye display unit 56R, a communication unit 57, and a power supply unit 58. The sensor 51 and the camera 52 may not be provided in the HMD 1 but may be provided in an external device such as a portable terminal owned by the user.

The sensor 51 includes an acceleration sensor, a gyro sensor, a positioning sensor, and the like. The sensor 51 is also provided with a line-of-sight detection device 51A that detects the direction of the user's line-of-sight. The sensor 51 outputs information representing various measurement results to the user information acquisition unit 53 and the peripheral information acquisition unit 54.

The camera 52 captures a scene in front of the user. The camera 52 supplies an image acquired by capturing to the user information acquisition unit 53 and the peripheral information acquisition unit 54.

The user information acquisition unit 53 specifies the state of the user, such as the position of the user and the action taken by the user, on the basis of the information supplied from the sensor 51 and the camera 52.

Furthermore, the user information acquisition unit 53 specifies which subject the user is viewing on the basis of the information supplied from the line-of-sight detection device 51A. An object presented by displaying the left-eye image and the right-eye image, a subject in an image captured by the camera 52, and the like are specified as subjects that the user is viewing. The user information acquisition unit 53 outputs, to the output control unit 55, user information including information representing the state of the user and information representing the subject that the user is viewing.

The peripheral information acquisition unit 54 specifies a situation around the user on the basis of the information supplied from the sensor 51 and the camera 52. For example, by analyzing an image captured by the camera 52, the positions of a building, a road, a sign, and the like are specified. The peripheral information acquisition unit 54 outputs peripheral information representing a situation around the user to the output control unit 55.

The output control unit 55 determines an object to be presented to the user on the basis of the content supplied from the communication unit 57. Furthermore, the output control unit 55 determines the presentation position of the object on the basis of the user information supplied from the user information acquisition unit 53 and the peripheral information supplied from the peripheral information acquisition unit 54.

During the execution of a predetermined application such as a game, in a case where the user information represents that the user is walking, and the peripheral information represents that there is a sign in front of the user, processing of determining the position of the sign as the presentation position of the object is performed.

The output control unit 55 generates a left-eye image and a right-eye image including the object on the basis of the content supplied from the communication unit 57. Furthermore, the output control unit 55 performs the luminance correction of the left-eye image and the right-eye image using the luminance correction pattern set on the basis of the presentation distance of the object.

The output control unit 55 outputs the left-eye image acquired by performing the luminance correction to the left-eye display unit 56L, and outputs the right-eye image to the right-eye display unit 56R.

The left-eye display unit 56L is a display provided in the left-eye optical system 11L. The left-eye display unit 56L displays the left-eye image supplied from the output, control unit 55.

The right-eye display unit 56R is a display provided in the right-eye optical system 11R. The right-eye display unit 56R displays the right-eye image supplied from the output control unit 55.

The communication unit 57 is a network interface. The communication unit 57 communicates with the content distribution server 2 via the network 3, and receives the content transmitted from the content distribution server 2. The content received by the communication unit 57 is supplied to the output control unit 55.

The power supply unit 58 includes a battery and a power supply circuit. The power supply unit 58 supplies power required for driving to each unit.

Figure 13:
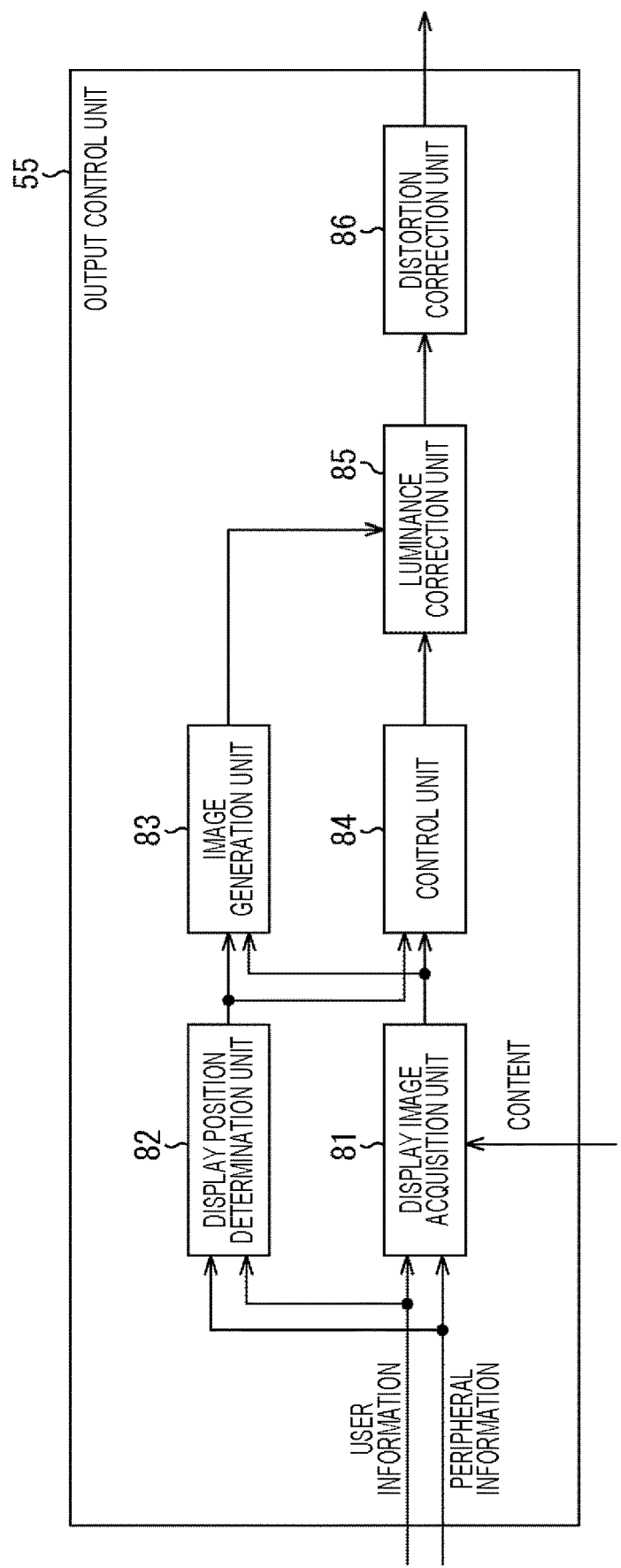
FIG. 13 is a block diagram showing a functional configuration example of an output control unit.

FIG. 13 is a block diagram showing a functional configuration example of the output control unit 55 of FIG. 12.

At least a part of the functional units shown in FIG. 13 is achieved, for example, by executing a predetermined program by a central processing unit (CPU) provided in the output control unit 55. The output control unit 55 is also provided with configurations such as a read only memory (ROM) in which a program executed by the CPU and the like are recorded, a random access memory (RAM) used for executing the program, and a graphics processing unit (CPU).

As shown in FIG. 13, the output control unit 55 includes a display image acquisition unit 81, a display position determination unit 82, an image generation unit 83, a control unit 84, a luminance correction unit 85, and a distortion correction unit 86. The user information output from the user information acquisition unit 53 and the peripheral information output from the peripheral information acquisition unit 54 are input to the display image acquisition unit 81 and the display position determination unit 82, respectively.

The display image acquisition unit 81 determines an object to be presented to the user on the basis of the state of the user represented by the user information and the peripheral situation represented by the peripheral information. The object to be presented to the user is selected from the objects included in the content supplied from the communication unit 57.

As described above, in a case where the user information represents that the user is walking, and the peripheral information represents that there is a sign in front of the user, an object to be presented at the position of the sign is determined. The display image acquisition unit 81 outputs information on the object to be presented to the user to the image generation unit 83 and the control unit 84. Information output from the display image acquisition unit 81 includes image data of the object.

The display position determination unit 82 determines the display position of the object on the basis of the user information and the peripheral information.

As described above, in a case where the user information represents that the user is walking, and the peripheral information represents that there is a sign in front of the user, the position of the sign is determined as the display position of the object. The display position determination unit 82 outputs information representing the display position of the object to the image generation unit 83 and the control unit 84.

The image generation unit 83 generates the left-eye image and the right-eye image including an object having a size and a shape corresponding to the display position determined by the display position determination unit 82 on the basis of the information supplied from the display image acquisition unit 81. Parallax is appropriately set for the object included in the left-eye image and the object included in the right-eye image. The image generation unit 83 outputs the left-eye image and the right-eye image to the luminance correction unit 85.

The control unit 84 specifies the presentation distance of the object on the basis of the display position determined by the display position determination unit 82. The display position of the object is represented by the presentation distance of the object and the position of the object on the image.

Furthermore, the control unit 84 sets a luminance correction region having a width corresponding to the presentation distance of the object in each of the left-eye image and the right-eye image. The control unit 84 functions as a control unit that sets the luminance correction region to be subjected to luminance correction on the basis of the presentation distance of the object.

The control unit 84 outputs information representing a luminance correction pattern for performing luminance correction in a portion of the luminance correction region to the luminance correction unit 85.

The luminance correction unit 85 applies luminance correction to the left-eye image and the right-eye image generated by the image generation unit 83 according to the luminance correction pattern set by the control unit 84. The luminance correction unit 85 outputs the left-eye image and right-eye image after luminance correction acquired by performing the luminance correction to the distortion correction unit 86.

The distortion correction unit 86 applies distortion correction to the left-eye image and right-eye image after luminance correction that has been supplied from the luminance correction unit 85. The distortion correction by the distortion correction unit 86 is processing such as projective transformation according to the characteristics of the optical system. The distortion correction unit 86 outputs the left-eye image after the distortion correction to the left-eye display unit 56L, and outputs the right-eye image after the distortion correction to the right-eye display unit 56R.

FIG. 14 is a diagram showing an example of processing for a left-eye image and a right-eye image.

As shown in FIG. 14, luminance correction for the left-eye image and the right-eye image is performed before distortion correction. In a case where the luminance correction is performed after the distortion correction, the setting of the luminance correction region becomes complicated. By performing luminance correction before distortion correction, the amount of calculation required for setting the luminance correction region can be suppressed.

Furthermore, by performing the luminance correction before the distortion correction, the luminance correction can be applied to ranges having the equal width from the image end, and therefore, images that can be easily fused can be generated. In a case where distortion to be corrected is slight, luminance correction may be performed after distortion correction.

<HMD Operation>

Here, the display processing of the HMD 1 having the above configuration will be described with reference to the flowchart of FIG. 15.

In step S1, the peripheral information acquisition unit 54 acquires peripheral information representing a situation around the user on the basis of information supplied from the sensor 51 and the camera 52.

In step S2, the user information acquisition unit 53 acquires user information representing the state of the user on the basis of the information supplied from the sensor 51 and the camera 52.

In step S3, the display image acquisition unit 81 and the display position determination unit 82 of the output control unit 55 each specify the situation around the user on the basis of the peripheral information. Furthermore, the display image acquisition unit 81 and the display position determination unit 82 each specify the state of the user on the basis of the user information.

In step S4, the display image acquisition unit 81 determines an object to be presented to the user on the basis of the state of the user and the peripheral situation.

In step S5, the display position determination unit 82 determines the display position of the object on the basis of the state of the user and the peripheral situation.

In step S6, the control unit 84 specifies the presentation distance of the object on the basis of on the display position determined in step S5, and determines a luminance correction pattern according to the presentation distance. In determining the luminance correction pattern, the shape of the object and the like are appropriately considered. The processing of determining a luminance correction pattern on the basis of an element other than the presentation distance will be described later.

In step S7, the image generation unit 83 generates a left-eye image and a right-eye image including an object having a predetermined size and shape.

In step S8, the luminance correction unit 85 applies luminance correction on the left-eye image and the right-eye image according to the luminance correction pattern.

In step S9, the distortion correction unit 86 applies distortion correction on the left-eye image and right-eye image after luminance correction.

In step S10, the left-eye display unit 56L, displays the left-eye image, and the right-eye display unit 56R displays the right-eye image. The left-eye image and the right-eye image displayed here are images after distortion correction. After the object is presented by displaying the left-eye image and the right-eye image, the processing returns to step S1, and the processing of step S1 and subsequent steps is performed.

While the power of the HMD 1 is turned on and a predetermined application for presenting a content object is being executed, the processing of steps S1 to S10 is repeated.

As described above, the HMD 1 can appropriately fuse the object to the user's eyes by changing the width of the region to be subjected to luminance correction according to the presentation distance of the object.

<Modification>

Example of Luminance Correction Based on Object Shape

The widths of the luminance correction region may be switched according to the aspect ratio of the object (the ratio between the vertical length and the horizontal length).

For example, in a case where the aspect ratio of the rectangular region surrounding the object is wider than 1:2, a luminance correction region having a smaller width is set than in a case where the aspect ratio is longer than 1:2. The width of the luminance correction region may be switched on the basis of the aspect ratio of 2:3.

Example of Luminance Correction Based on Object Size

The width of the luminance correction region may be switched according to the size of the object.

For example, in a case where the presentation distance of the object is short and the object does not fit in the binocular vision region, a luminance correction region having a smaller width is set than in a case where the object fits in the binocular vision region.

The widths of the luminance correction region may be switched according to the area ratio of the object, for example, in a case where the ratio of the area of the object to the area of the entire display region is 40% or more, the luminance correction region having a smaller width is set than in a case where the area ratio is less than 40%.

Example of Luminance Correction Based on Object Shape and Size

The widths of the luminance correction region may be switched using a combination of the shape and area ratio of the object.

For example, in a case where the aspect ratio of the object is wider than 1:2, and the area ratio of the object to the area of the entire image is 40% or more, the luminance correction region having a smaller width is set than in a case where those conditions are not satisfied.

As described above, the setting of the luminance correction region is performed on the basis of at least one of the presentation distance of the object, the aspect ratio of the object, or the area ratio of the object to the area of the entire image.

The ease of fusion changes depending on the display of the portion across the monocular vision region and the binocular vision region. As described above, by changing the width of the luminance correction region according to the shape of the object and the ratio of the object in the image, it is possible to present an object that can be more easily fused.

In a case of presenting a plurality of objects having different presentation distances, the width of the luminance correction region may be determined on the basis of the shape and size of the closest object.

Figure 16:
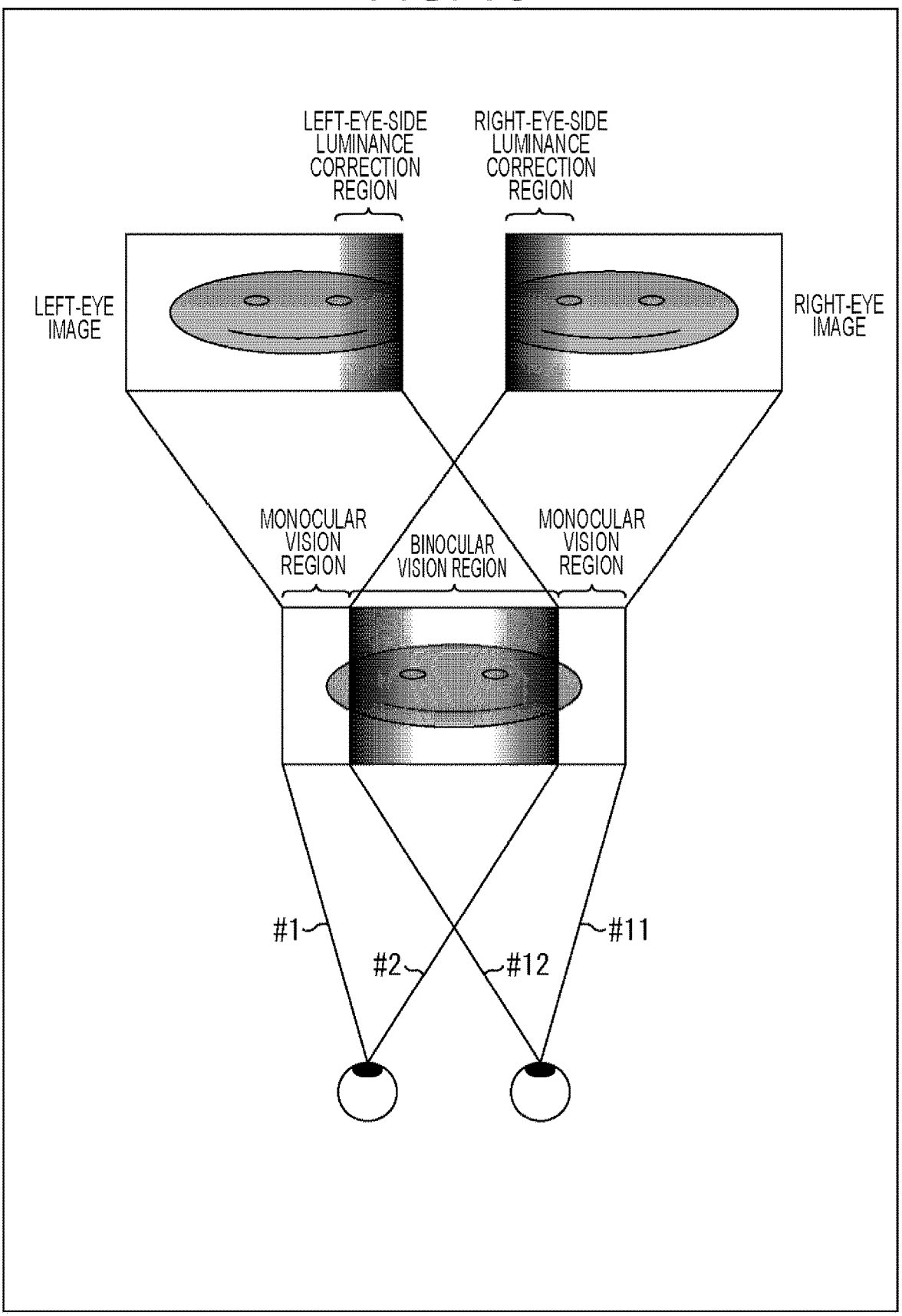
FIG. 16 is a diagram showing a display example of the left-eye image and the right-eye image according to a line-of-sight non-intersecting method.

Example of Line-of-Sight Non-Intersecting Method/Line-of-Sight Intersecting Method FIG. 16 is a diagram showing a display example of the left-eye image and the right-eye image according to a line-of-sight non-intersecting method.

Note that the display method of the left-eye image and the right-eye image described with reference to FIG. 6 and the like is the line-of-sight non-intersecting method. In a case where the binocular vision regions are arranged in an overlapping manner as shown in the middle part of FIG. 16, in the line-of-sight non-intersecting method, the left-eye image is arranged on the left side of the right-eye image, and is guided to the left eye of the user. Furthermore, the right-eye image is arranged on the right side of the left-eye image, and is guided to the right eye of the user. The binocular vision region is formed closer to the right end in the left-eye image, and formed closer to the left end in the right-eye image.

In a case of the line-of-sight non-intersecting method, as described above, the luminance correction region is set at the right end of the left-eye image and the luminance correction of the left-eye image is performed, and the luminance correction region is set at the left end of the right-eye image and the luminance correction of the right-eye image is performed.

Figure 17:
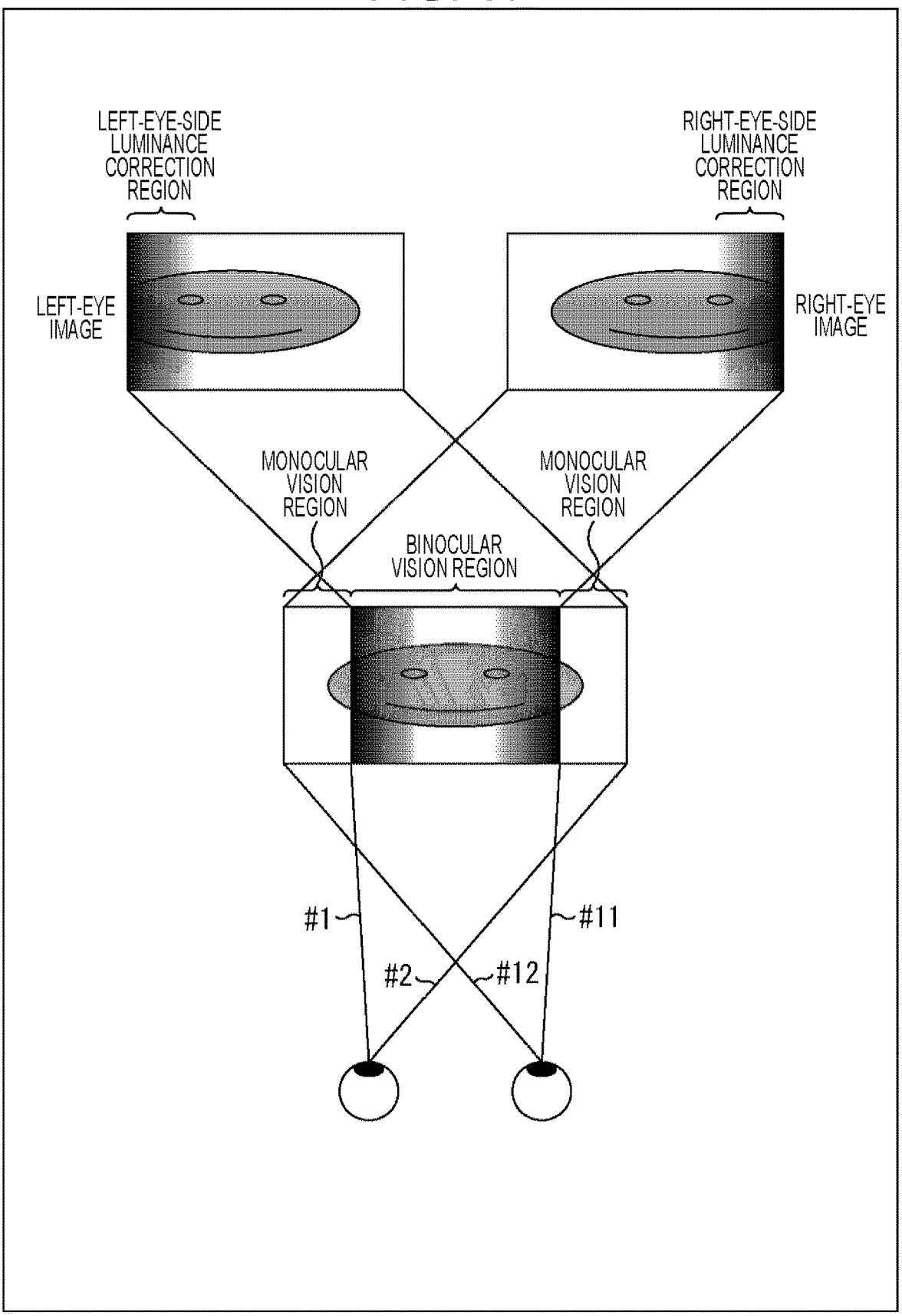
FIG. 17 is a diagram showing a display example of the left-eye image and the right-eye image according to a line-of-sight intersecting method.

FIG. 17 is a diagram showing a display example of the left-eye image and the right-eye image according to a line-of-sight intersecting method.

In a case where the binocular vision regions are arranged in an overlapping manner as shown in the middle part of FIG. 17, in the line-of-sight intersecting method, the left-eye image is arranged on the right side of the right-eye image, and is guided to the left eye of the user. Furthermore, the right-eye image is arranged on the left side of the left-eye image, and is guided to the right eye of the user. The binocular vision region is formed closer to the left end in the left-eye image, and formed closer to the right end in the right eye image.

In a case of the line-of-sight intersecting method, the luminance correction region is set at the left end of the left-eye image and the luminance correction of the left-eye image is performed, and the luminance correction region is set at the right end of the right-eye image and the luminance correction of the right-eye image is performed.

As described above, also in a case where the object presentation method is the line-of-sight intersecting method and the luminance correction regions are set at the left end of the left-eye image and the right end of the right-eye image, respectively, the width of the luminance correction region is set according to the presentation distance of the object as described above.

Note that, in a case of the line-of-sight intersecting method, on the contrary to the case of the line-of-sight non-intersecting method, the luminance correction region having a smaller width is set as the presentation distance of the object is longer. Also in the case of the line-of-sight intersecting method, the width of the luminance correction region is set so as to change linearly or stepwise according to the presentation distance of the object. The width of the luminance correction region may be set using at least one of the shape or size of the object as well as the presentation distance of the object.

This also makes it possible to present an object that can be easily fused.

Other Examples of Setting the Luminance Correction Region

In a case where the object fits only in the monocular vision region, the luminance correction processing may not be performed. Therefore, the load on the GPO can be reduced.

Figure 18:
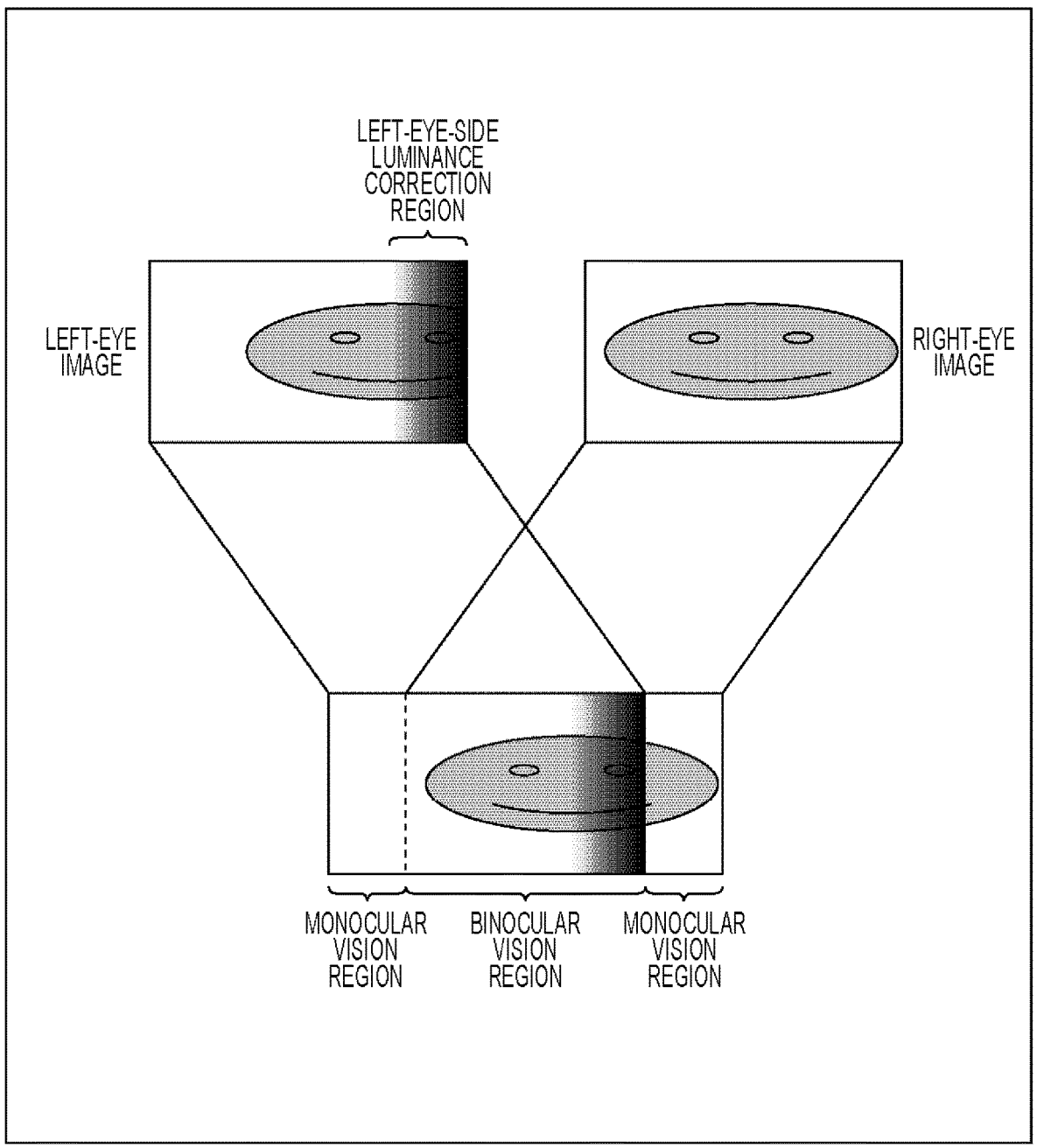
FIG. 18 is a diagram showing another display example of the left-eye image and the right-eye image.

FIG. 18 is a diagram showing another example of the left-eye image and the right-eye image.

In the left-eye image of FIG. 18, the object is arranged rightward, and a part of the right side of the object does not fit in the display region. The right side part of the object that does not fit in the left-eye image is presented using the right-eye image.

On the other hand, in the right-eye image, the objects are arranged so as to fit in the display region.

In this case, as shown in the lower part of FIG. 18, the luminance correction is applied only to the region inside the right boundary across which the object is displayed, on the left and right boundaries of the binocular vision region. That is, the luminance correction region is set at the right end of the left-eye image, and the luminance correction for the left-eye image is performed, whereas the luminance correction for the right-eye image is not performed.

As described above, in a case where the object does not cover the end of the display region (the right end of the left-eye image and the left end of the right-eye image), it is possible to prevent the luminance correction for the region from being performed. The luminance correction processing is performed on at least one of the left-eye image or the right-eye image.

Figure 19:
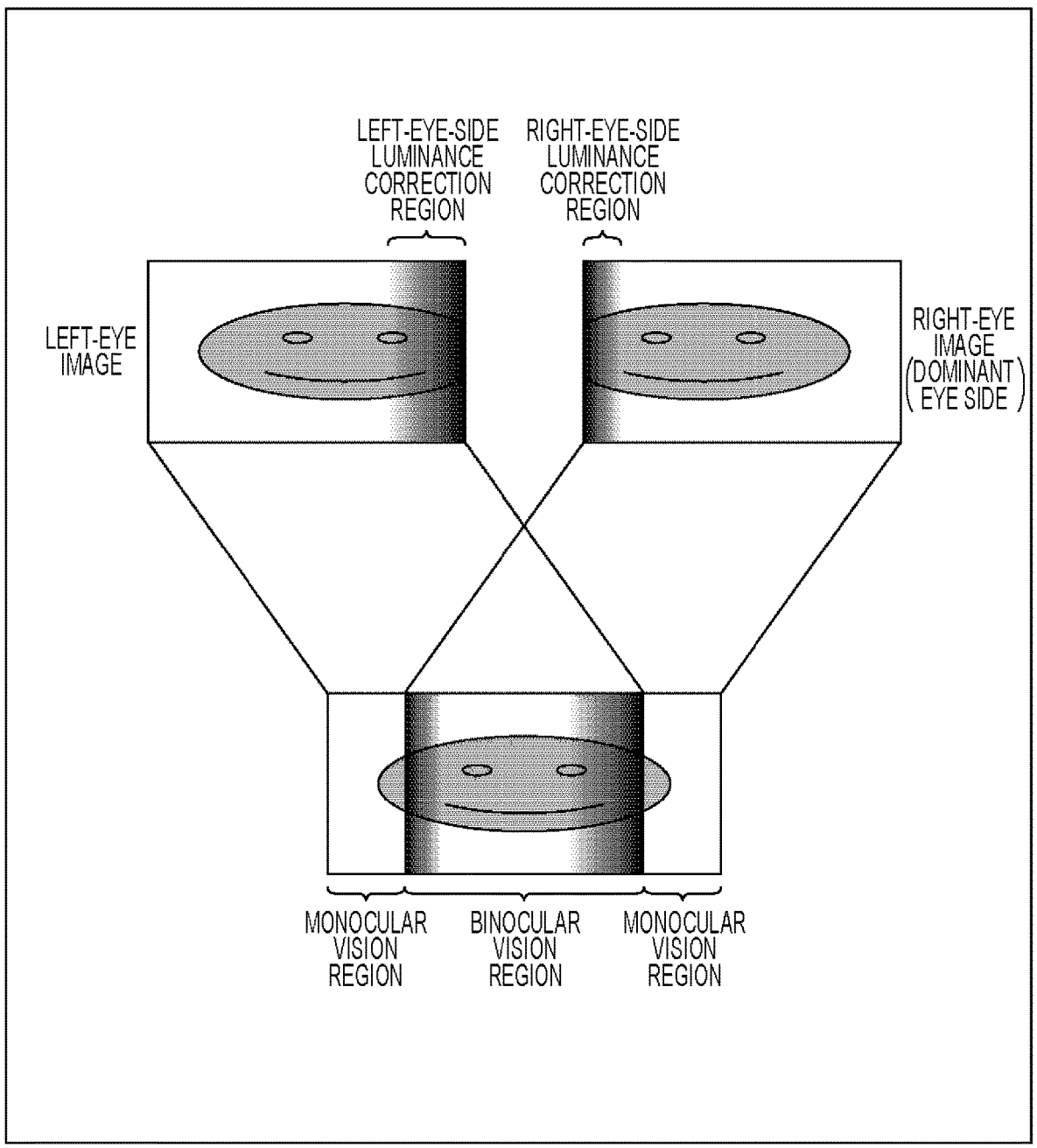
FIG. 19 is a diagram snowing another display example of the left-eye image and the right-eye image.

FIG. 19 is a diagram showing another example of the left-eye image and the right-eye image.

In the example of FIG. 19, it is assumed that the dominant eye of the user is the right eye. In this case, for example, the dominant eye is selected at the time of initial setting, and information indicating the dominant eye of the user is recorded in the HMD 1.

Note that, in the example of FIG. 19, the object of the left-eye image covers the right end, and the object of the right-eye image covers the left end. The luminance correction region is set at the right end of the left-eye image, and the luminance correction region is set at the left end of the right-eye image and the luminance correction is applied to each of the left-eye image and the right-eye image.

In a case where the dominant eye of the user is the right eye, as shown in FIG. 19, for the right-eye image on the dominant eye side, a luminance correction region having smaller width than that of the luminance correction region set for the left-eye image is set.

Generally, in the human brain, information on the dominant eye side is more likely to be prioritized. By reducing the width of the luminance correction region of the image on the dominant eye side as described above, an effect that fusion can be easily performed even at a short distance can be expected.

Second Embodiment for Display of Auxiliary Image

Hereinafter, the display of the auxiliary image in the HMD 1 will be described.

<Example of Changing Display Position of Auxiliary Image According to Gaze Distance>

Figure 20:
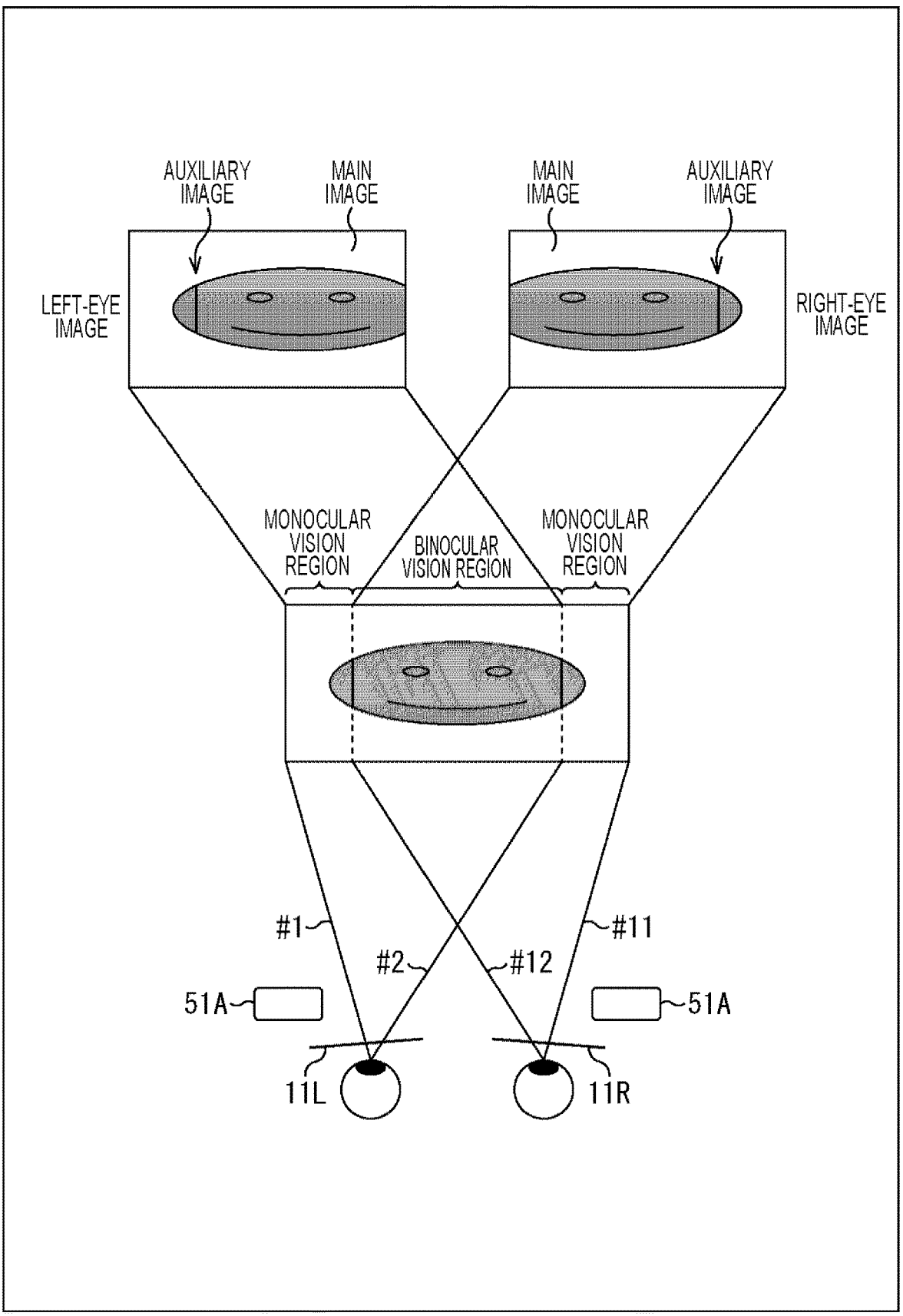
FIG. 20 is a diagram showing a display example of an auxiliary image in the line-of-sight non-intersecting method.

FIG. 20 is a diagram showing a display example of an auxiliary image in the line-of-sight non-intersecting method.

As shown in the upper part of FIG. 20, an auxiliary image is displayed on the boundary between the binocular vision region and the monocular vision region of each of the left-eye image and the right-eye image so as to overlap the main image including the object. In the example of FIG. 20, a thin line in the vertical direction is displayed as an auxiliary image.

The width of the binocular vision region varies depending on the gaze distance of the user. In the HMD 1, the widths of the binocular vision region and the monocular vision region change according to the distance at which the user gazes, and the display position of the auxiliary image is adjusted accordingly.

Where the user is gazing is specified on the basis of, for example, a line-of-sight direction detected by a line-of-sight detection device 51A provided near the left-eye optical system 11L and the right-eye optical system. 11R. The convergence angle is calculated on the basis of the line-of-sight directions of both eyes, and the gaze distance of the user is specified on the basis of the calculated convergence angle.

FIG. 20 shows the display position of the auxiliary image in a case where the user's gaze distance is as long as 5 m. For example, in a case where a main image including a plurality of objects is displayed and the user is gazing at an object at a position of 5 m, auxiliary images are displayed at intervals as shown in FIG. 20.

Note that, in the middle part of FIG. 20, broken lines are shown above and below the auxiliary image, and these broken lines are lines indicating the range of the display regions of the left-eye image and the right-eye image, and does not represent the image synthesized with the main image.

Figure 21:
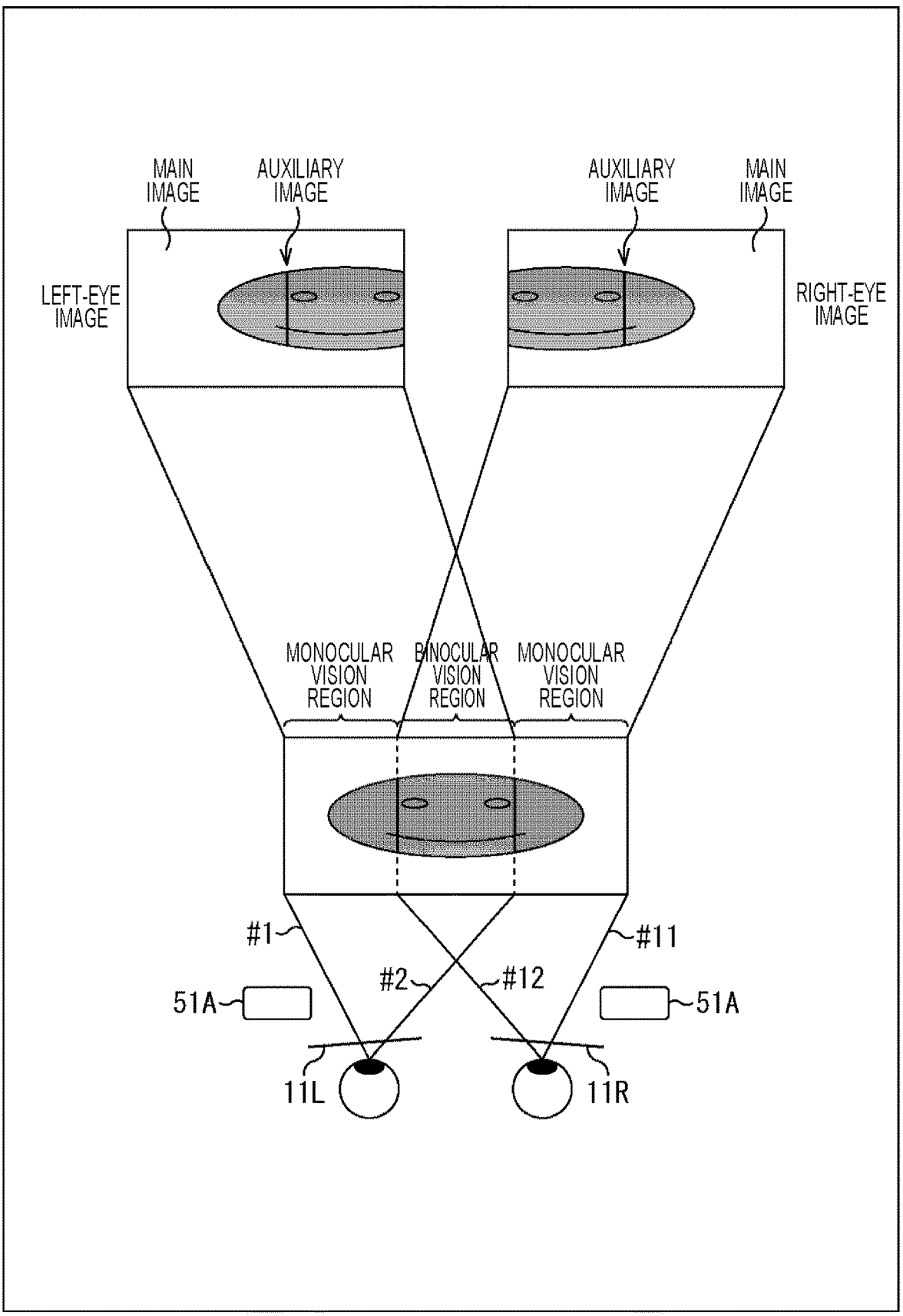
FIG. 21 is a diagram showing a display example of an auxiliary image in a case where a gaze distance is short.

FIG. 21 is a diagram showing a display example of an auxiliary image in a case where a gaze distance of the user is short.

Of the plurality of objects, in a case where the user is gazing at an object at a close position such as 35 cm, as shown in FIG. 21, the width of the binocular vision region becomes smaller than in FIG. 20, and accordingly, the display position of the auxiliary image is also changed. Note that, in a case of the line-of-sight intersecting method, the closer the object the user gazes at, the larger the width of the binocular vision region.

By changing the display position of the auxiliary image according to the distance that the user is gazing, even in a case where the presentation distances of the object are switched as described above, the adverse effect due to the visual field conflict can be suppressed.

Note that, in FIGS. 20 and 21, the auxiliary image is represented by a solid black line, but black cannot be displayed on the transmissive HMD. The display of the auxiliary image is actually achieved by changing at least one of luminance, chromaticity, or saturation of a solid line portion indicating the auxiliary image.

For example, by reducing the luminance of the boundary between the binocular vision region and the monocular vision region, which is the part where the auxiliary image is displayed, of the original image (image of the object) to 50%, the display of the auxiliary image is achieved. Therefore, an auxiliary image having a luminance that is correlated with the luminance of the original image is displayed, and a sufficient contrast for suppressing an adverse effect due to a visual field conflict can be achieved.

In the HMD 1, the above-described luminance adjustment is performed together with such display of the auxiliary image.

<Configuration of HMD>

Figure 22:
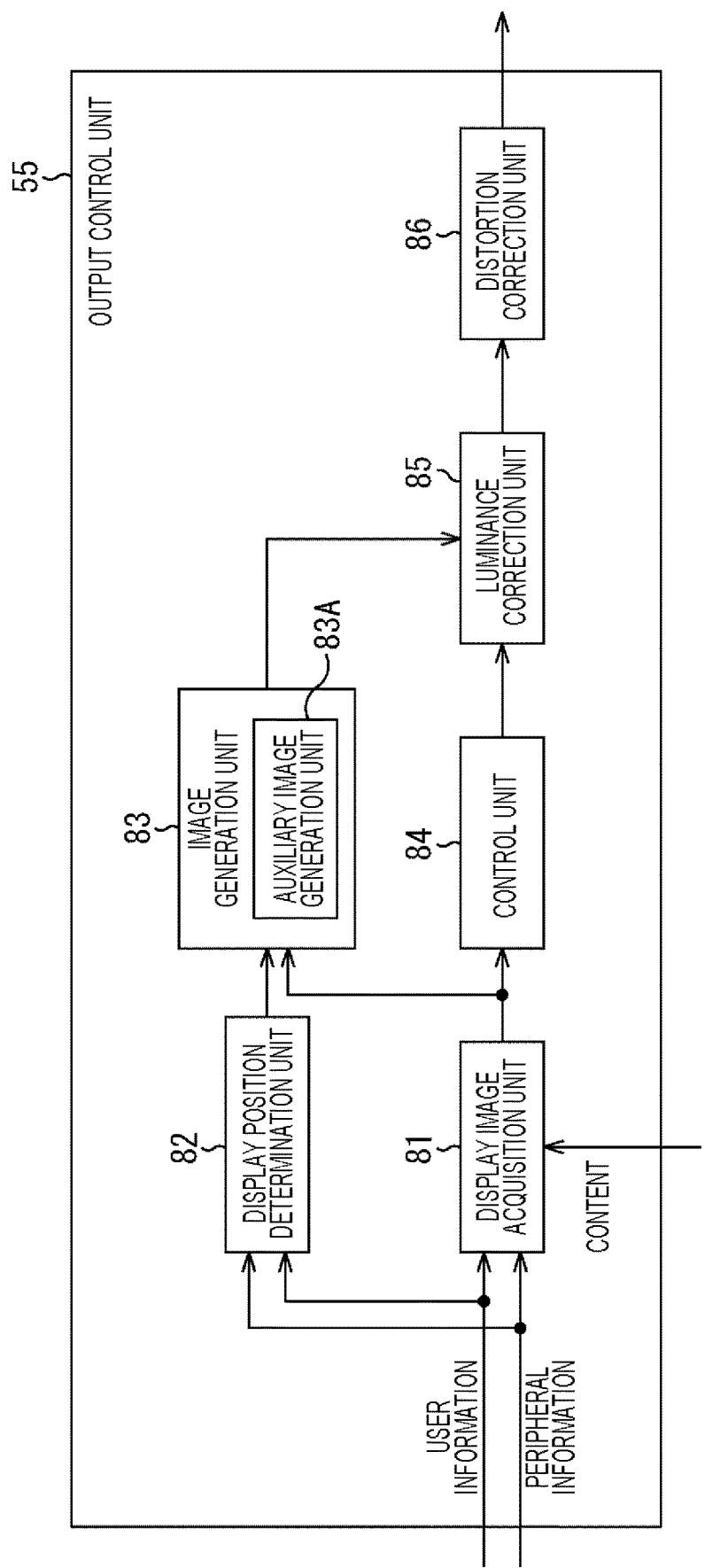
FIG. 22 is a block diagram showing a functional configuration example of an output control unit.

FIG. 22 is a block diagram showing a functional configuration example of the output control unit 55.

The configuration of the output control unit 55 shown in FIG. 22 is the same as the configuration described with reference to FIG. 13 except that an auxiliary image generation unit 83A is provided in the image generation unit 83. Redundant explanations are omitted as appropriate. User information including information on the user's line-of-sight, direction detected by the line-of-sight detection device 51A is input to the image generation unit 83 via the display position determination unit 82, for example.

The image generation unit 83 generates the main images of the left-eye image and the right-eye image including an object having a size and a shape corresponding to the display position determined by the display position determination unit 82 on the basis of the image supplied from the display image acquisition unit 81.

Furthermore, the image generation unit 83 synthesizes the main image of each of the left-eye image and the right-eye image with the auxiliary image generated by the auxiliary image generation unit 83A, The image generation unit 83 outputs the left-eye image and the right-eye image including the auxiliary image to the luminance correction unit 85.

The auxiliary image generation unit 83A generates an auxiliary image to be synthesized with the boundary between the binocular vision region and the monocular vision region of each of the left-eye image and the right-eye image. The auxiliary image generated by the auxiliary image generation unit 83A is synthesized with the respective main images of the left-eye image and the right-eye image.

<HMD Operation>

Here, the processing of the HMD 1 for presenting an object by displaying the left-eye image and the right-eye image in which the above-described auxiliary images are synthesized will be described.

Figure 23:
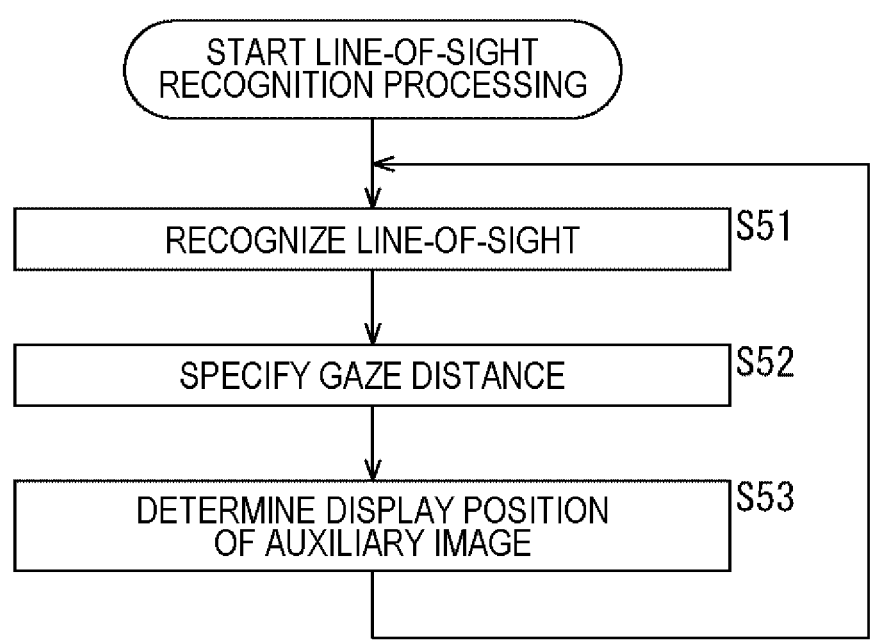
FIG. 23 is a flowchart for explaining line-of-sight recognition processing of the HMD.

First, the line-of-sight recognition processing of the HMD 1 will be described with reference to the flowchart in FIG. 23. The processing of FIG. 23 is performed in parallel with, for example, the processing described later with reference to FIG. 24.

In step S51, the line-of-sight detection device 51A recognizes the line-of-sight of the user viewing the object.

In step S52, the auxiliary image generation unit 83A detects the convergence angles of both eyes on the basis of the direction of the user's line-of-sight, and specifies the gaze distance.

In step S53, the auxiliary image generation unit 83A determines the display position of the auxiliary image on the basis of the gaze distance of the user. The above processing is repeated while the object is being displayed.

Next, the display processing of the HMD 1 will be described with reference to the flowchart of FIG. 24.

Figure 24:
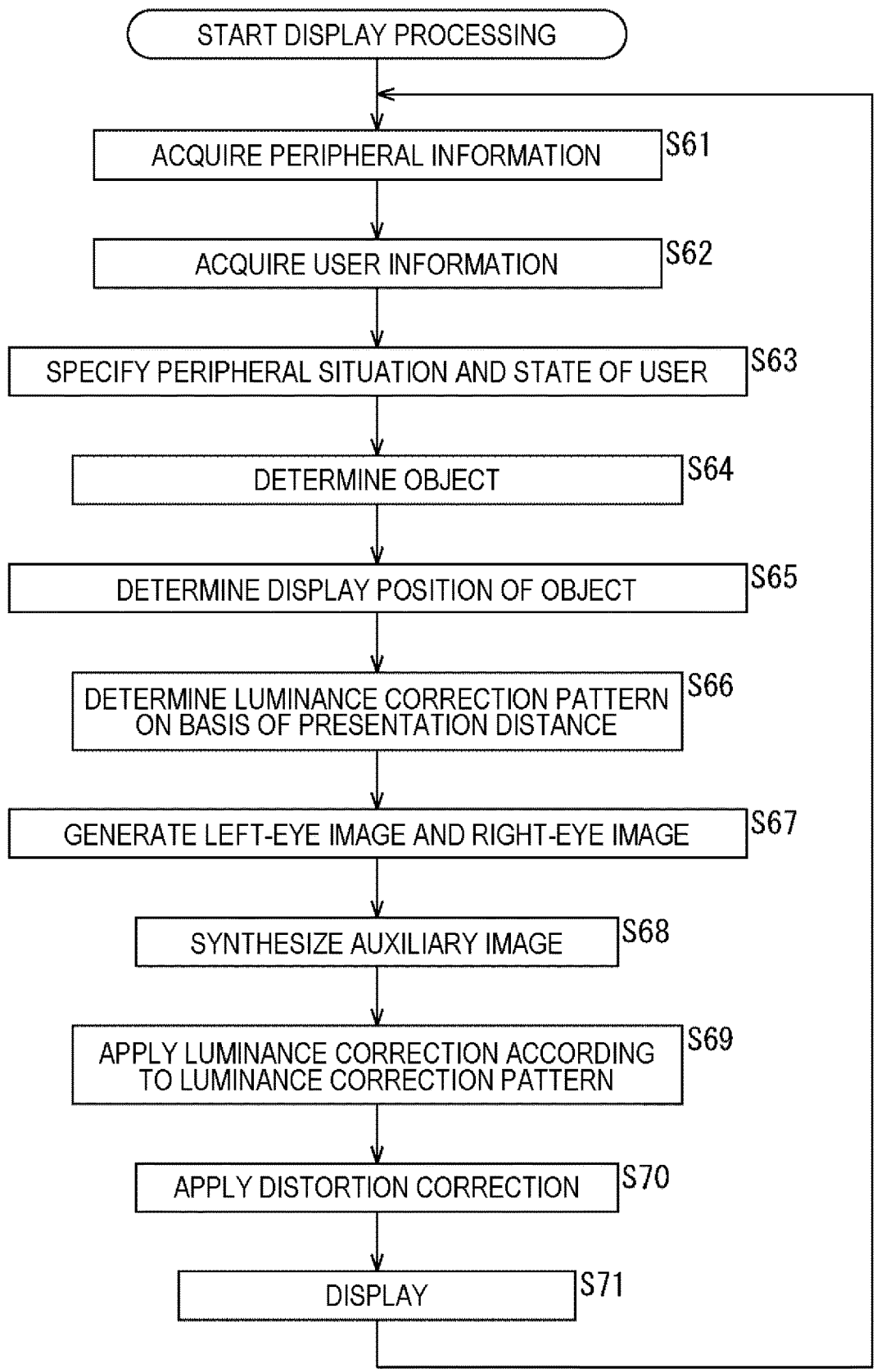
FIG. 24 is a flowchart for explaining display processing of the HMD.

The processing in FIG. 24 is similar processing to the processing described with reference to FIG. 15, except that the synthesizing of the auxiliary images is performed.

Figure 15:
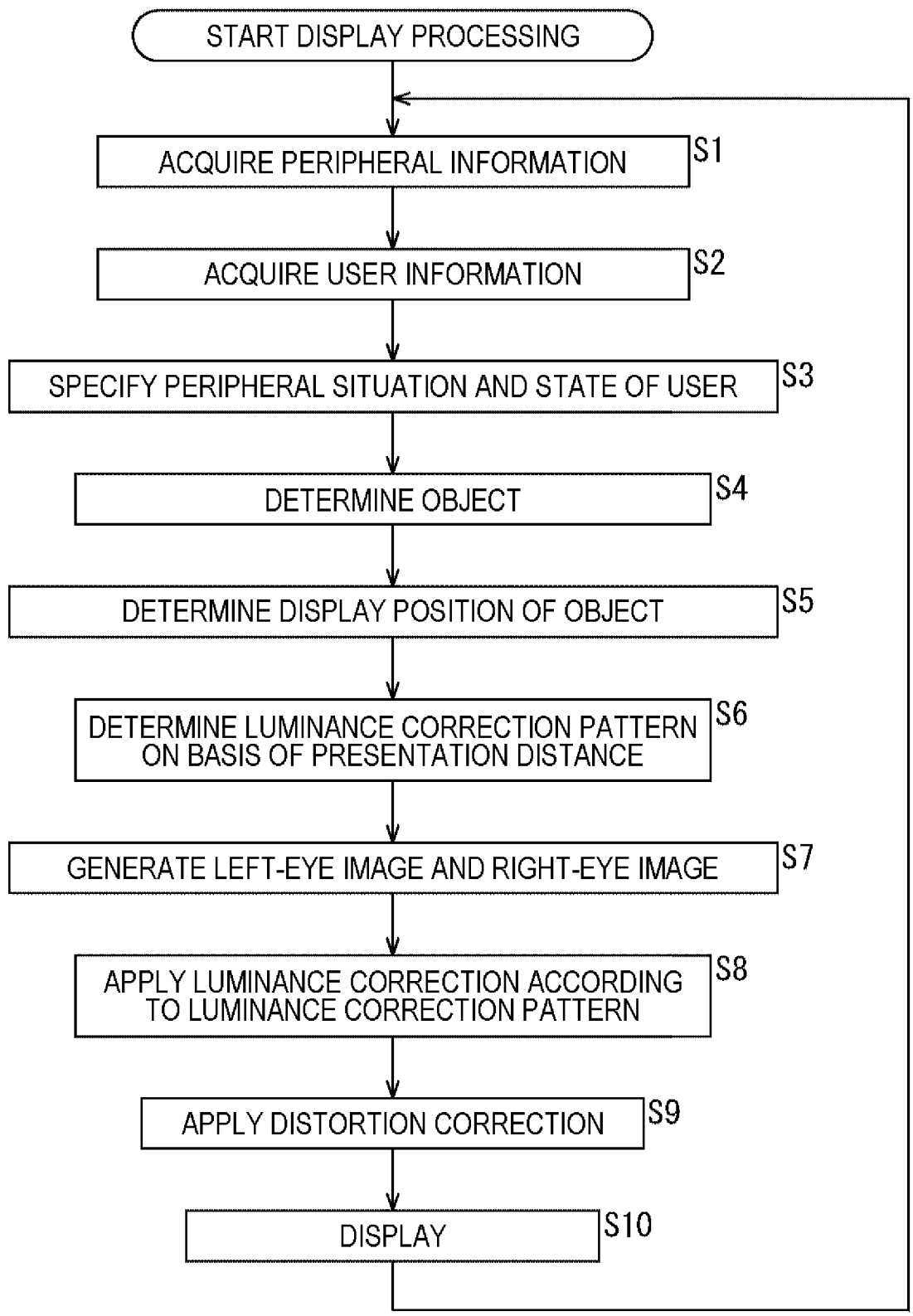
FIG. 15 is a flowchart for explaining display processing of the HMD.

After the processing similar to the processing of steps S1 to S7 of FIG. 15 is performed in steps S61 to S67, in step S68, the image generation unit 83 synthesizes the auxiliary image with main images of each of the left-eye image and the right-eye image.

In step S69, the luminance correction unit 85 applies luminance correction on the left-eye image and the right-eye image with which the auxiliary image is synthesized according to the luminance correction pattern.

In step S70, the distortion correction unit 86 applies distortion correction on the left-eye image and right-eye image after luminance correction.

In step S71, the left-eye display unit 56L displays the left-eye image, and the right-eye display unit. 56R displays the right-eye image. Therefore, the left-eye image and the right-eye image in which the auxiliary image is synthesized with the boundary between the binocular vision region and the monocular vision region are displayed, and the object is presented.

The user can see the object in such a manner that an adverse effect caused by the visual field conflict is suppressed.

<Example of Changing Display Position of Auxiliary Image According to Object Distance>

In the above description, the display position of the auxiliary image is adjusted by specifying the gaze distance of the user. However, the display position of the auxiliary image may be adjusted according to the presentation distance of the object. In this case, the processing is performed on the assumption that the presentation distance of the object and the gaze distance of the user match.

In a case where a plurality of objects is presented, the display position of the auxiliary image is adjusted according to the presentation distance of the main object such as the largest object or the object closest to the center of the image. In this case, the line-of-sight detection device 51A becomes unnecessary.

Figure 25:
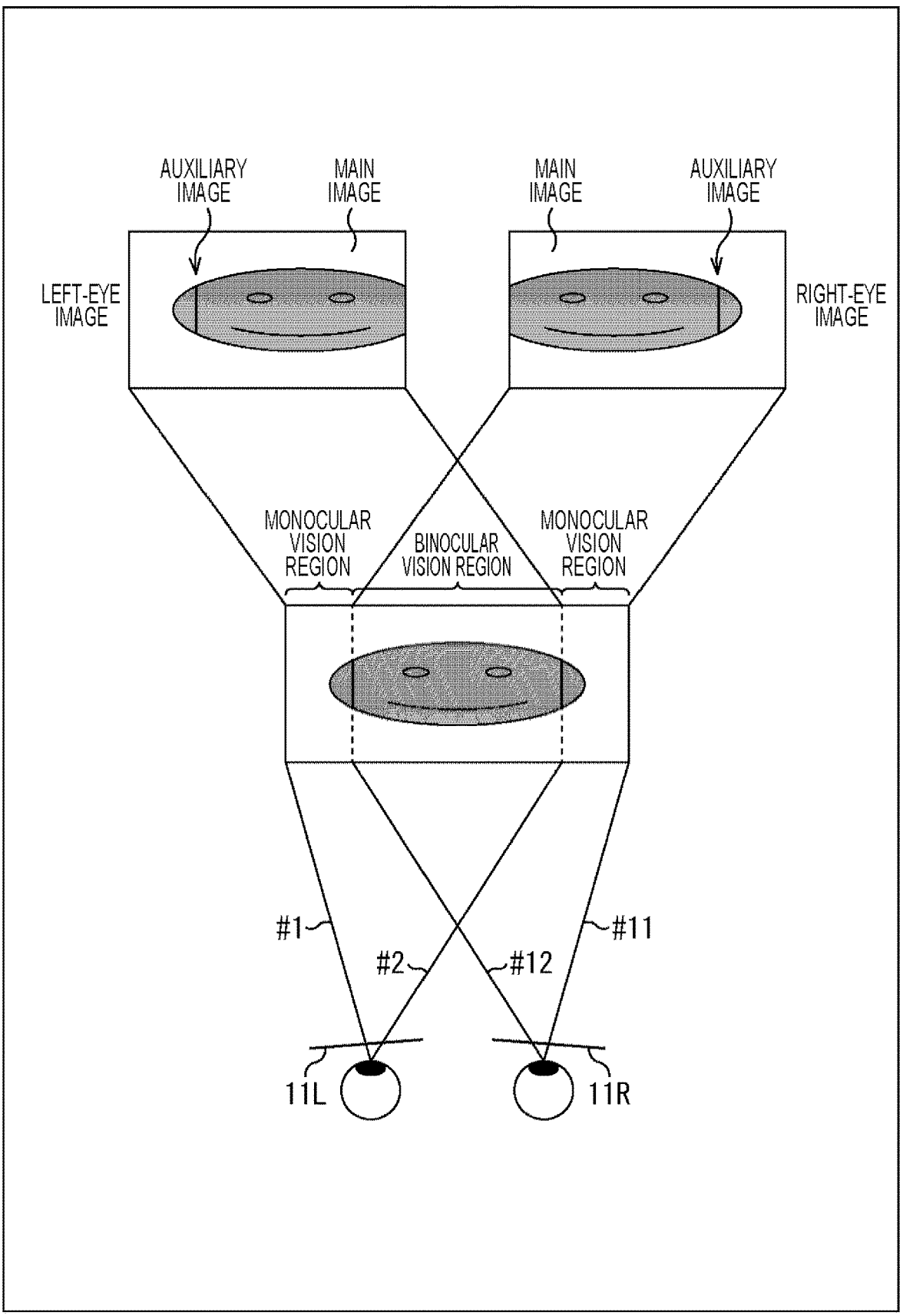
FIG. 25 is a diagram showing a display example of the auxiliary image.
Figure 26:
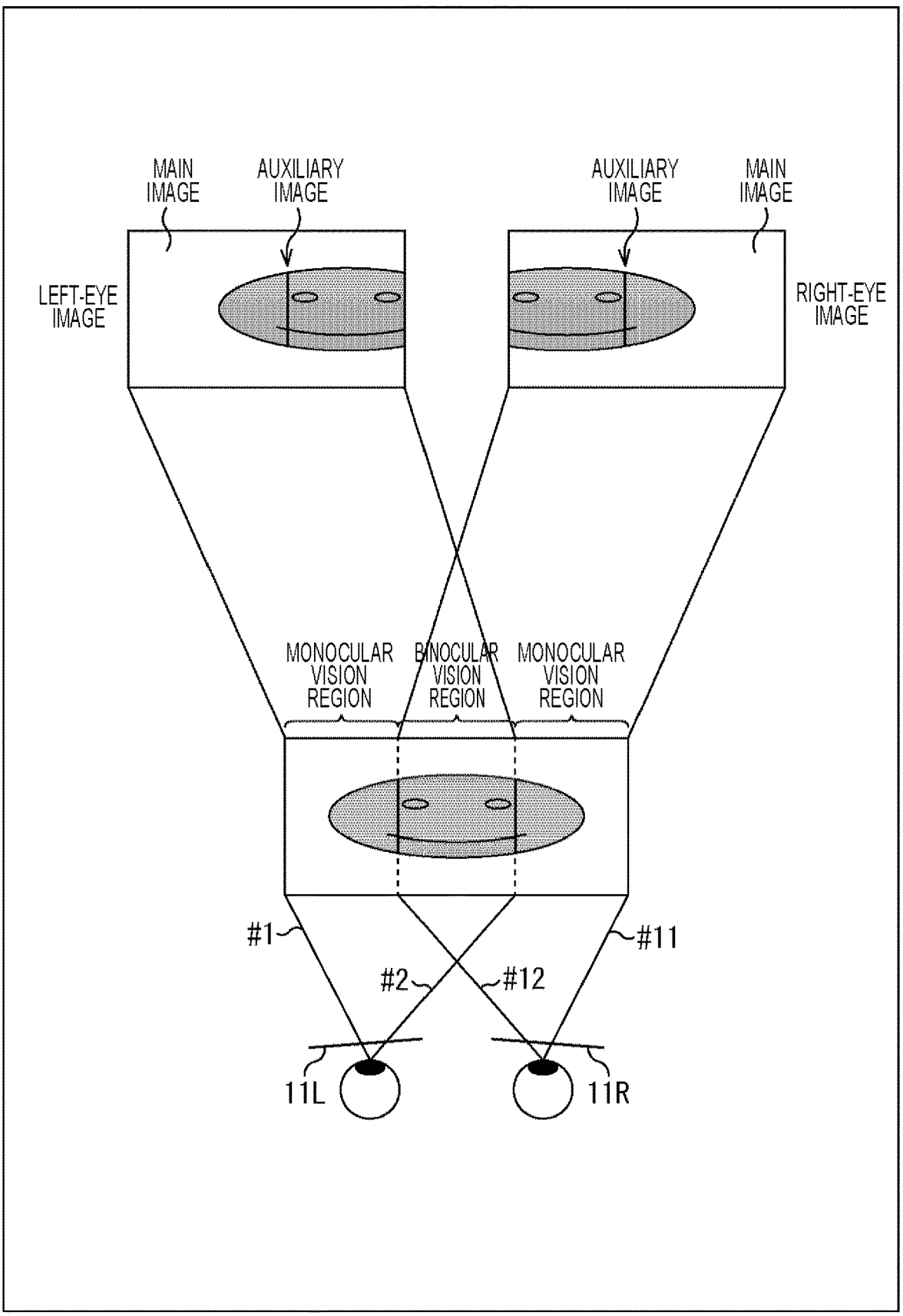
FIG. 26 is a diagram showing a display example of the auxiliary image.

FIGS. 25 and 26 are diagrams showing display examples of the auxiliary image.

FIG. 25 shows a display example of the auxiliary image in a case where the presentation distance of the main object is long, and FIG. 26 shows a display example of the auxiliary image in a case where the presentation distance of the main object is short. In a case of the line-of-sight intersecting method, the closer the object the user gazes at, the larger the width of the binocular vision region.

As shown in FIGS. 25 and 26, the width of the binocular vision region changes according to the presentation distance of the main object, and the display position of the auxiliary image is adjusted accordingly. Note that the display of the auxiliary images shown in FIGS. 25 and 26 is the same as the display described with reference to FIGS. 20 and 21, respectively.

<HMD Operation>

The processing of the HMD 1 that adjusts the display position of the auxiliary image according to the presentation distance of the main object will be described with reference to the flowchart in FIG. 27.

Figure 27:
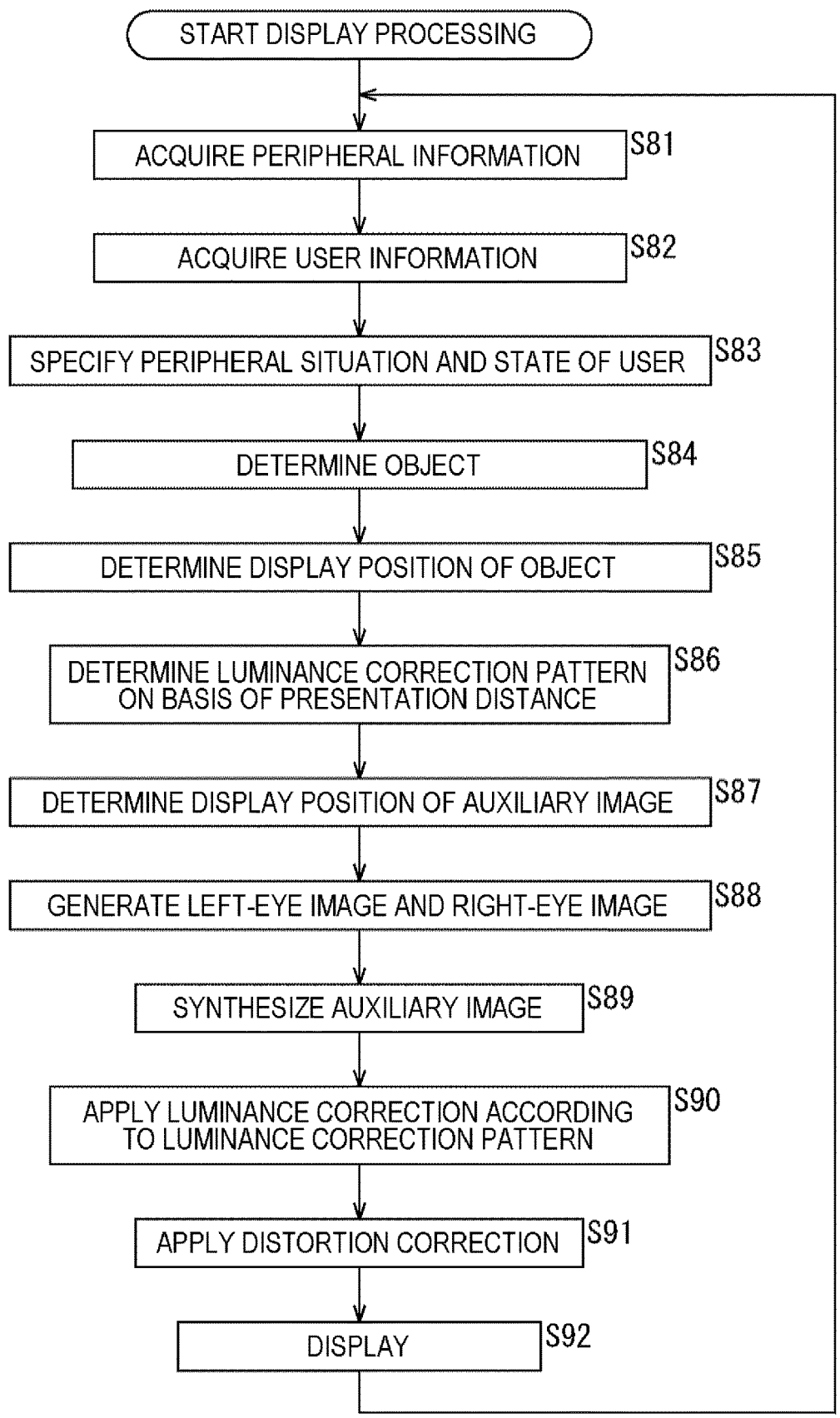
FIG. 27 is a flowchart for explaining display processing of the HMD.

The processing of FIG. 27 is similar processing to the processing described with reference to FIG. 24, except that the processing or determining the display position of the auxiliary image according to the presentation distance of the object is performed. In steps S81 to S86, similar processing to the processing in steps S61 to S66 in FIG. 24 is performed.

In step S87, the image generation unit 83 determines the display position of the auxiliary image according to the presentation distance of the main object.

In step S88, the image generation unit 83 generates a left-eye image and a right-eye image including an object having a predetermined size and shape. The left-eye image and the right-eye image each include at least a main object.

In step S89, the image generation unit 83 synthesizes the auxiliary image with the main image of each of the left-eye image and the right-eye image. The synthesized position of the auxiliary image is a boundary between the binocular vision region and the monocular vision region set according to the presentation distance of the main object.

The processing from step S90 is similar to the processing from step S69 in FIG. 24. That is, in step S90, the luminance correction unit 85 applies luminance correction on the left-eye image and the right-eye image with which the auxiliary image is synthesized according to the luminance correction pattern.

In step S91, the distortion correction unit 86 applies distortion correction on the left-eye image and right-eye image after luminance correction.

In step S92, the left-eye display unit 56L, displays the left-eye image, and the right-eye display unit 56R displays the right-eye image. Therefore, the left-eye image and the right-eye image in which the auxiliary image is synthesized with the boundary between the binocular vision region and the monocular vision region are displayed, and the object is presented.

Figure 28:
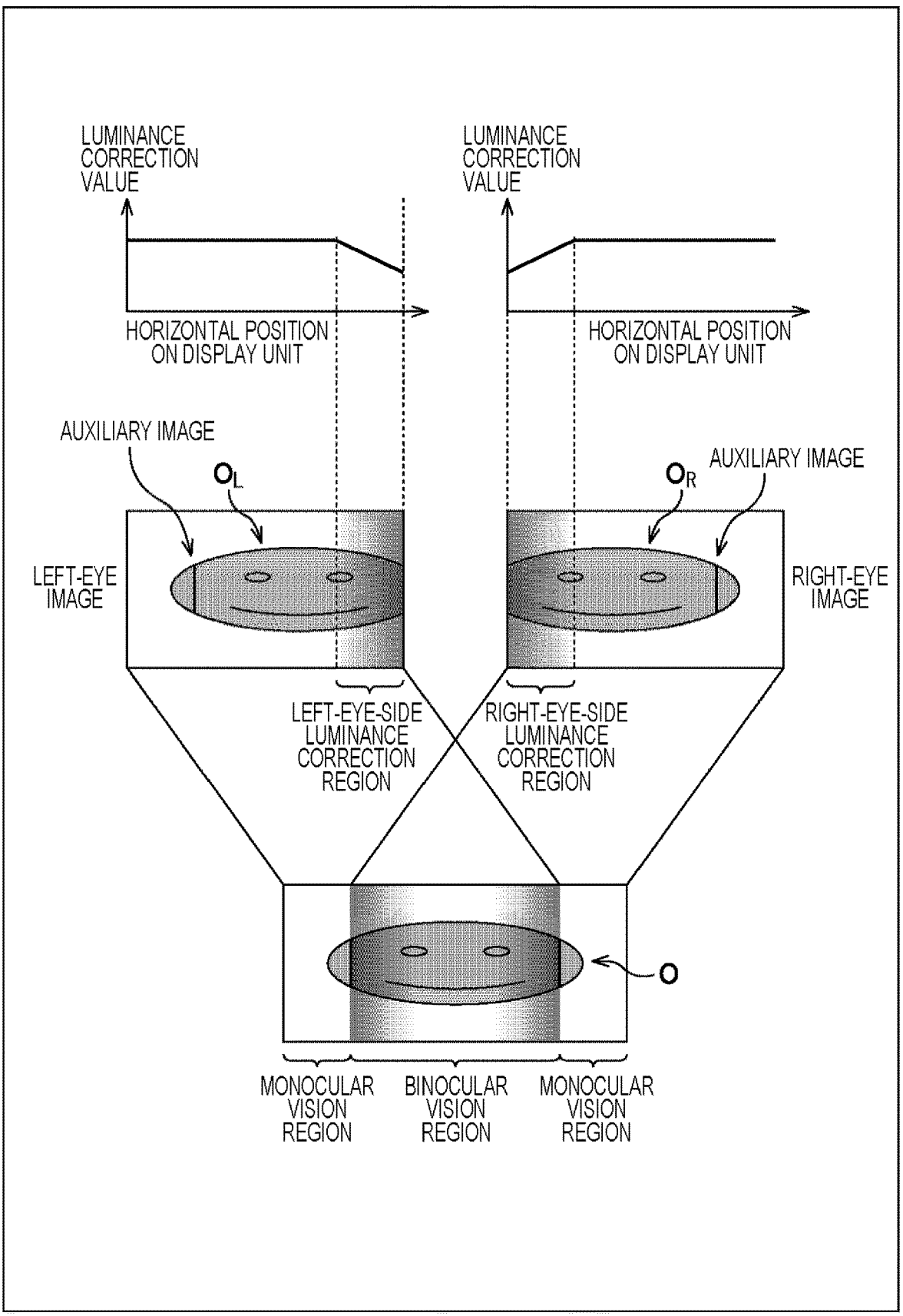
FIG. 28 is a diagram showing an example of the left-eye image and the right-eye image.

FIG. 28 is a diagram showing an example of the left-eye image and the right-eye image on which luminance adjustment and synthesizing of an auxiliary image have been performed by the above processing.

As shown in the middle part of FIG. 28, in the portion of the left-eye side luminance correction region of the object $O_L$ in the left-eye image, the luminance gradually decreases as approaching the right end. Furthermore, the auxiliary image is displayed in an overlapping manner at a position on the object $O_L$ across the boundary between the binocular vision region and the monocular vision region.

On the other hand, in the portion of the right-eye-side luminance correction region of the object $O_R$ in the right-eye image, the luminance gradually decreases as approaching the left end. Furthermore, the auxiliary image is displayed in an overlapping manner at a position on the object $O_R$ across the boundary between the binocular vision region and the monocular vision region.

As described above, by displaying the left-eye image and the right-eye image on which the auxiliary image has been synthesized and the luminance has been corrected, it is possible to more effectively reduce visual fiend conflict.

Furthermore, by combining with the synthesis of the auxiliary image, the amount of correction when the luminance is reduced by the luminance correction can be reduced, and an image with a small change in brightness at the boundary portion can be presented.

As shown in the upper part of FIG. 28, the luminance correction pattern in the case of combining the auxiliary image synthesis and the luminance correction is a pattern in which the correction amount is suppressed as compared with the correction amount in a case where the synthesis of the auxiliary images is not performed as described with reference to FIG. 8, in the portion of the end of display unit (the right end of the left-eye display unit 56L and the left end of the right-eye display unit 56R).

In a case of combining with the synthesis of the auxiliary image, a sufficient effect can be acquired even if a luminance correction pattern with a reduced correction amount is used.

<Modification>

Figure 29:
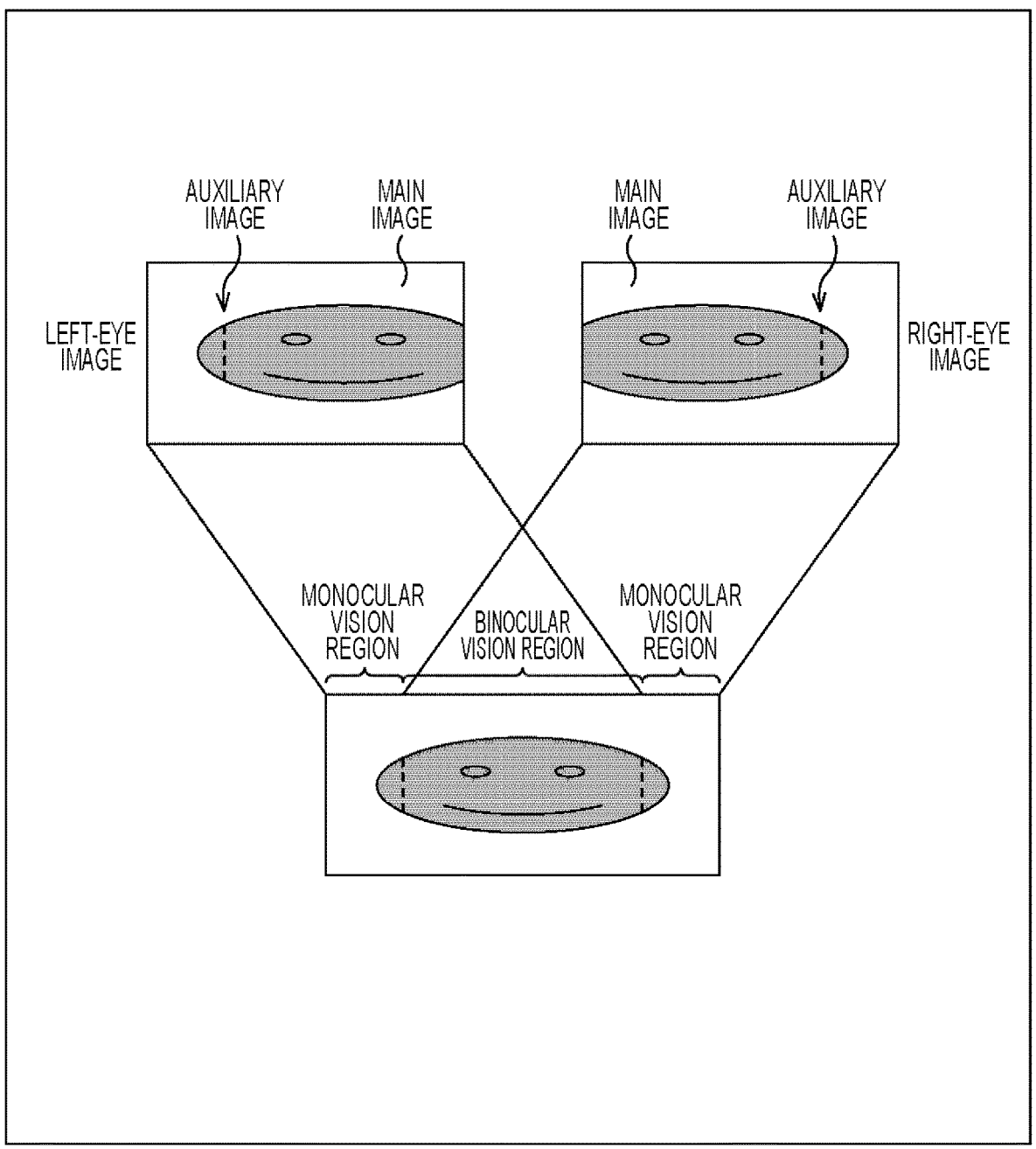
FIG. 29 is a diagram showing another display example of the auxiliary image.

FIG. 29 is a diagram showing another display example of the auxiliary image.

In the example of FIG. 29, the auxiliary image is a broken line image. As described above, an image of another line type, such as a broken line, can be used as an auxiliary image instead of an image of a solid line.

Figure 30:
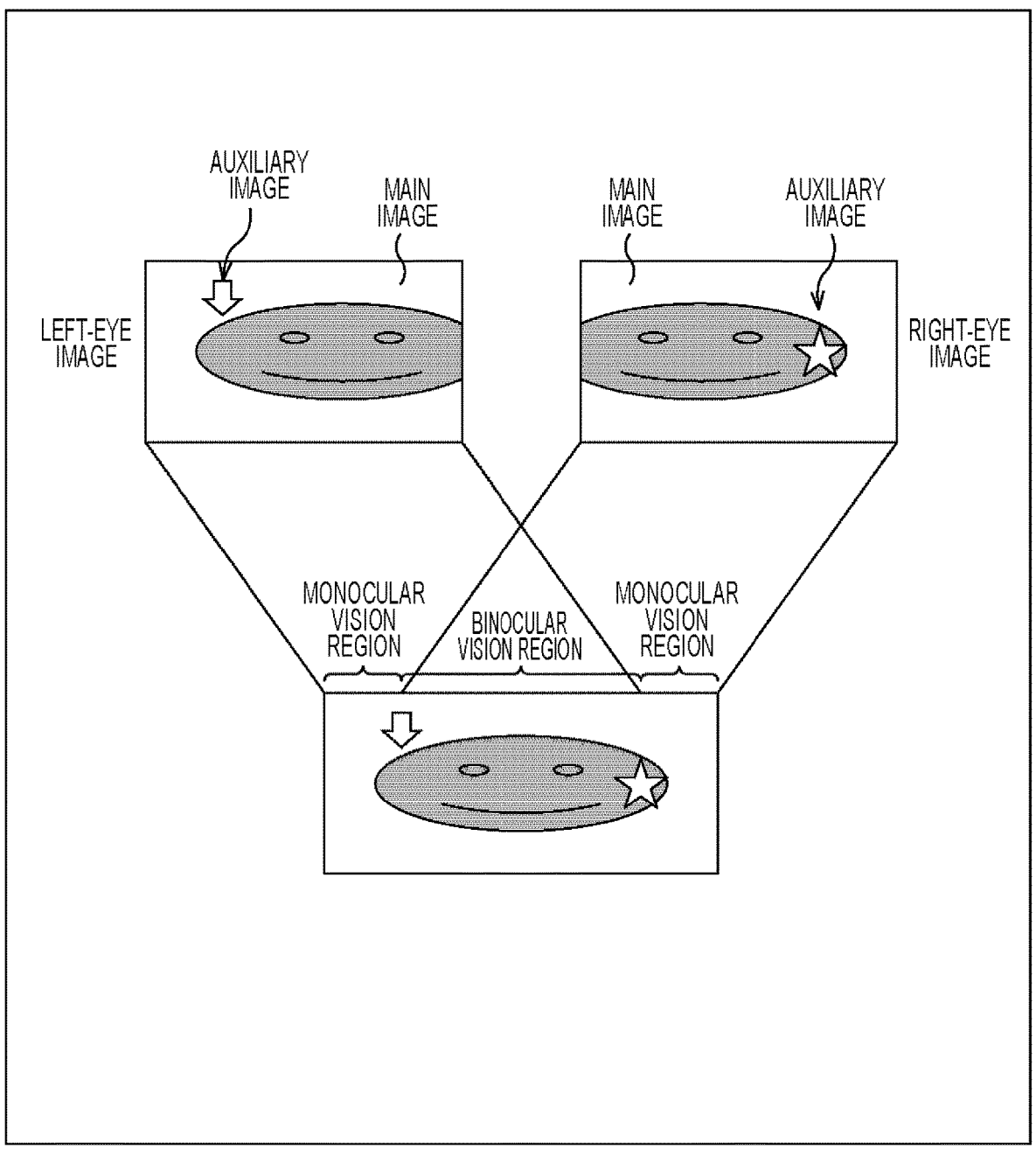
FIG. 30 is a diagram showing another display example of the auxiliary image.

FIG. 30 is a diagram showing another display example of the auxiliary image.

In the example of FIG. 30, the auxiliary image is an arrow-shaped image or a star-shaped image. As described above, images such as icons and marks of various shapes can be used as auxiliary images. The type and shape of the auxiliary image are appropriately selected according to the type of the object.

In the above, the case where the size of the object is a size across both the left and right boundaries of the binocular vision region has been described. However, in a case where the size of the object is a size across only one of the left and right boundaries, the auxiliary image is displayed in a similar way at the boundary portion across which the object exists.

Figure 31:
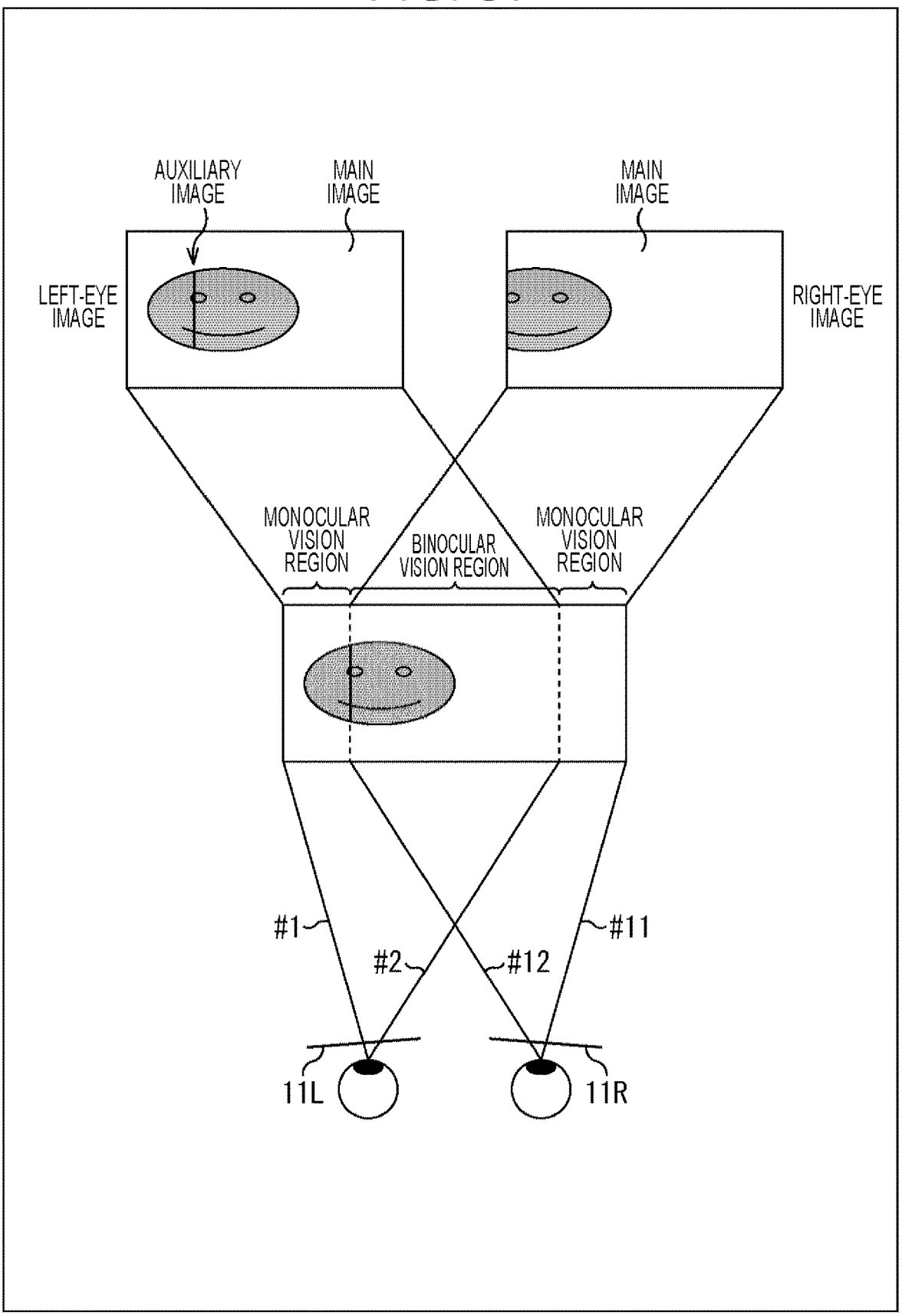
FIG. 31 is a diagram showing another display example of the auxiliary image.

FIG. 31 is a diagram showing another display example of the auxiliary image.

In the example of FIG. 31, the objects are arranged so as to be across the left end of the binocular vision region. In this case, as shown in the upper left of FIG. 31, the auxiliary image is synthesized only with the left-eye image. The synthesis position of the auxiliary image is the position of the boundary between the binocular vision region and the monocular vision region.

As described above, the synthesis of the auxiliary image is performed only on the image in which the object is across the boundary between the nocular vision region and the monocular vision region.

The luminance of the line displayed as the auxiliary image may be adjusted by the user as desired. Furthermore, the user may be allowed to select display/non-display of the auxiliary image.

Other Examples

Although description has been made such that the generation of the left-eye image and the right-eye image is performed by the HMD 1, the generation may be performed by the content distribution server 2.

Figure 32:
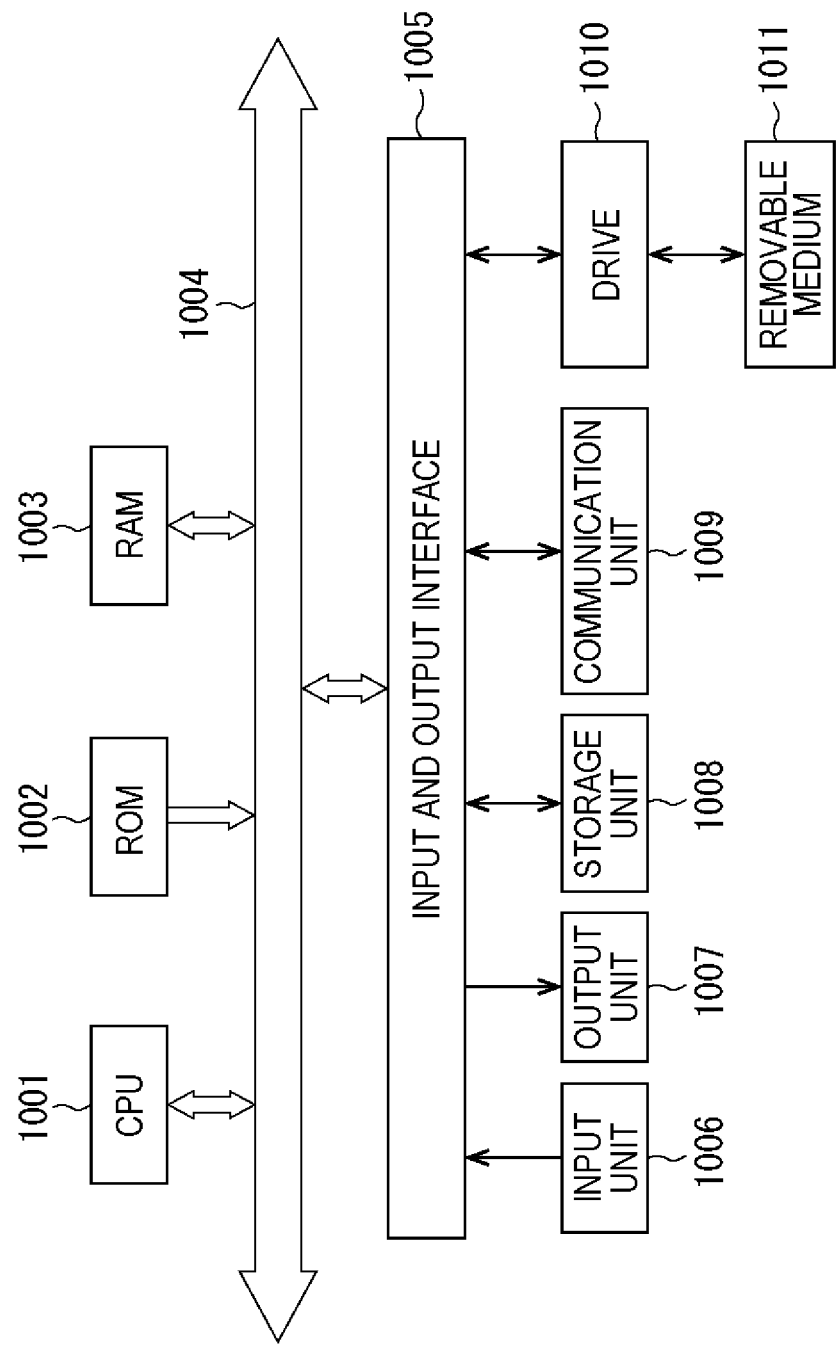
FIG. 32 is a block diagram showing a configuration example of a content distribution server.

FIG. 32 is a block diagram showing a configuration example of the content distribution server 2.

The CPU 1001, the ROM 1002, and the RAM 1003 are mutually connected by a bus 1004.

An input and output interface 1005 is further connected to the bus 1004. The input and output interface 1005 is connected to an input unit 1006 including a keyboard, a mouse, and the like, and an output unit 1007 including a display, a speaker, and the like.

Furthermore, the input and output interface 1005 is connected to a storage unit 1008 including a hard disk, a non-volatile memory, and the like, a communication unit 1009 including a network interface and the like, and a drive 1010 for driving a removable medium 1011.

In the computer having the configuration as shown in FIG. 32, for example, the CPU 1001 loads a program stored in the storage unit 1008 into the RAM 1003 and executes the program, so that the output control unit 55 having the configuration shown in FIG. 13 or FIG. 22 is achieved.

The output control unit 55 achieved in the content distribution server 2 controls the communication unit 1009 to communicate with the HMD 1. The output control unit 55 generates the left-eye image and the right-eye image on the basis of the user information and the peripheral information transmitted from the HMD 1, transmits the images to the HMD 1, and causes display of the image.

In the HMD 1, the left-eye image and the right-eye image transmitted from the content distribution server 2 are received by the communication unit 57, and are supplied to and displayed on the left-eye display unit 56L and the right-eye display unit 56R, respectively.

As described above, it is possible to present the object under the control of the content distribution server 2.

Furthermore, in the above description, the HMD 1 is an AR head mounted display having a transmissive display device, but may be a VR head mounted display having a non-transmissive display device. Each display device for the left eye and the right eye provided in the VR head mounted display is also provided in a state where an offset is set to the left and right in order to enlarge the viewing angle.

<Computer Configuration Example>

The series of processing described above can be also executed by hardware or can be executed by software. In a case of executing a series of processing by software, a program included the software is installed to a computer incorporated in dedicated hardware, a general personal computer, or the like.

The installed program is provided by being recorded on a removable medium 1011 shown in FIG. 32 including an optical disc (compact disc-read only memory (CD-ROM), digital versatile disc (DVD), or the like), a semiconductor memory, and the like. Furthermore, the program may be provided via a wired or wireless transmission medium such as a local area network, the Internet, or digital broadcasting. The program can be installed in the ROM 1002 or the storage unit 1008 in advance.

Note that the program executed by the computer may be a program of processing in chronological order according to the order described in the present specification or may be a program of processing in parallel or at necessary timing such as when a call is made.

In this specification, a system means a set of plurality of constituent elements (devices, modules (parts), or the like), and it does not matter whether or not all constituent elements are in the same casing. Therefore, a plurality of devices that is housed in separate housings and is connected via a network, and one device in which a plurality of modules is housed in one housing are both systems.

Note that the effects described in the present specification are merely examples and are not intended to be limiting, and other effects may be provided.

The embodiments of the present technology are not limited to the above-described embodiments, and various modifications are possible without departing from the gist of the present technology.

For example, in the present technology, it is possible to adopt a configuration of cloud computing in which one function is shared by a plurality of devices via a network, and is collaboratively processed.

Furthermore, each step described in the above-described flowchart can be executed by one device or shared and executed by a plurality of devices.

Moreover, in a case where a plurality of processes is included in one step, a plurality of processes included in the one step can be executed by one device or shared and executed by a plurality of devices.

<Examples of Configuration Combinations>

The present technology can adopt the following configuration.

(1)

An information processing apparatus including:

an acquisition unit that outputs a left-eye image and a right-eye image to acquire position information of an object in a depth direction to be perceived by a user; and a control unit that sets a luminance correction region to be subjected to luminance correction to at least one of a first display region that is included in a display region for the left-eye image and overlaps a display region for the right-eye image, or a second display region that is included in the display region for the right-eye image and overlaps the display region for the left-eye image on the basis of the position information.

(2)

The information processing apparatus according to above (1), further including a luminance correction unit that performs luminance correction on the luminance correction region.

(3)

The information processing apparatus according to above (2), in which the luminance correction unit performs luminance correction so as to decrease luminance of the luminance correction region.

(4)

The information processing apparatus according to above (2) or (3), in which the luminance correction unit performs luminance correction such that luminance decreases as approaching an end of a display region in which the luminance correction region has been set.

(5)

The information processing apparatus according to any one of above (1) to (4), in which the control unit sets the luminance correction region having a larger width as a position of the object in the depth direction is further away.

(6)

The information processing apparatus according to any one of above (1) to (5), in which the control unit sets the luminance correction region at a right end of the first display region and a left end of the second display region.

The information processing apparatus according to any one of above (1) to (4), in which the control unit sets the luminance correction region having a smaller width as a position of the object in the depth direction is further away.

(8)

The information processing apparatus according to any one of above (1) to (4) and (7), in which the control unit sets the luminance correction region at a left end of the first display region and a right end of the second display region.

(9)

The information processing apparatus according to any one of above (5) to (8), in which the control unit changes a width of the luminance correction region linearly or stepwise.

(10)

The information processing apparatus according to any one of above (1) to (9), in which the control unit sets the luminance correction region using at least one of a shape or a size of the object together with the position information.

(11)

The information processing apparatus according to any one of above (2) to (4), further including a distortion correction unit that performs distortion correction for the left-eye image and the right-eye image that have been subjected to luminance correction.

(12)

The information processing apparatus according to any one of above (1) to (11), in which the control unit sets the luminance correction region to an inside of the first display region and the second display region serving as binocular vision region.

(13)

The information processing apparatus according to above (12), in which the control unit sets the binocular vision region having a width corresponding to a position of the object, and further includes an image generation unit that generates a predetermined image representing a boundary between the binocular vision region and a monocular vision region that is a region outside the binocular vision region.

(14) The information processing apparatus according to above (13), in which the control unit sets the binocular vision region having a width corresponding to a convergence angle of both eyes of the user viewing the object.

(15) The information processing apparatus according to above (13), in which the control unit sets the binocular vision region having a width corresponding to a position of the object is the depth direction represented by the position information.

(16) The information processing apparatus according to any one of above (13) to (15), in which the image generation unit generates an image that varies according to the object, as the predetermined image.

(17) The information processing apparatus according to any one of above (13) to (16), in which the image generation unit generates an image obtained by changing luminance of the object, as the predetermined image.

(18) The information processing apparatus according to any one of above (13) to (17), in which the image generation unit generates an image obtained by changing at least one of chromaticity or saturation of the object, as the predetermined image.

(19) An information processing method including, by an information processing apparatus:

outputting a left-eye image and a right-eye image to acquire position information of an object in a depth direction to be perceived by a user; and setting a luminance correction region to be subjected to luminance correction to at least one of a first display region that is included in a display region for the left-eye image and overlaps a display region for the right-eye image, or a second display region that is included is the display region for the right-eye image and overlaps the display region for the left-eye image on the basis of the position information.

(20) A recording medium in which a program is recorded, the program for causing a computer to execute processing of:

outputting a left-eye image and a right-eye image to acquire position information of an object in a depth direction to be perceived by a user; and setting a luminance correction region to be subjected to luminance correction to at least one of a first display region that is included in a display region for the left-eye image and overlaps a display region for the right-eye image, or a second display region that is included in the display region for the right-eye image and overlaps the display region for the left-eye image on the basis of the position information.

REFERENCE SIGNS LIST

1 HMD
51 Sensor
51A Line-of-sight detection device
52 Camera
53 User information acquisition unit
54 Peripheral information acquisition unit
55 Output control unit
56L Left-eye display unit
56R Right-eye display unit
57 Communication unit
58 Power supply unit
81 Display image acquisition unit
82 Display position determination unit
83 Image generation unit
83A Auxiliary image generation unit
84 Control unit
85 Luminance correction unit
86 Distortion correction unit

The invention claimed is:

1. An information processing apparatus comprising:
an acquisition unit configured to output a left-eye image and a right-eye image to acquire position information of an object in a depth direction to be perceived by a user; and
a control unit configured to set a luminance correction region to be subjected to luminance correction to at least one of a first display region that is included in a display region for the left-eye image and overlaps a display region for the right-eye image, or a second display region that is included in the display region for the right-eye image and overlaps the display region for the left-eye image on a basis of the position information,
wherein the control unit sets the luminance correction region to a binocular vision region having a width corresponding to a position of the object, and
wherein the acquisition unit and the control unit are each implemented via at least one processor.

2. The information processing apparatus according to claim 1, further comprising:
a luminance correction unit configured to perform luminance correction on the luminance correction region,
wherein the luminance correction unit is implemented via at least one processor.

3. The information processing apparatus according to claim 2, wherein
the luminance correction unit performs luminance correction so as to decrease luminance of the luminance correction region.

4. The information processing apparatus according to claim 2, wherein
the luminance correction unit performs luminance correction such that luminance decreases as approaching an end of a display region in which the luminance correction region has been set.

5. The information processing apparatus according to claim 1, wherein
the control unit sets the luminance correction region having a larger width as a position of the object in the depth direction is further away.

6. The information processing apparatus according to claim 1, wherein
the control unit sets the luminance correction region at a right end of the first display region and a left end of the second display region.

7. The information processing apparatus according to claim 1, wherein
the control unit sets the luminance correction region having a smaller width as a position of the object in the depth direction is further away.

8. The information processing apparatus according to claim 1, wherein the control unit sets the luminance correction region at a left end of the first display region and a right end of the second display region.

9. The information processing apparatus according to claim 5, wherein
the control unit changes a width of the luminance correction region linearly or stepwise.

10. The information processing apparatus according to claim 1, wherein
the control unit sets the luminance correction region using at least one of a shape or a size of the object together with the position information.

11. The information processing apparatus according to claim 2, further comprising:
a distortion correction unit configured to perform distortion correction for the left-eye image and the right-eye image that have been subjected to luminance correction,
wherein the distortion correction unit is implemented via at least one processor.

12. The information processing apparatus according to claim 1, wherein
the control unit sets the luminance correction region to an inside of the first display region and the second display region serving as the binocular vision region.

13. The information processing apparatus according to claim 12, further comprising:
an image generation unit configured to generate a predetermined image representing a boundary between the binocular vision region and a monocular vision region that is a region outside the binocular vision region,
wherein the image generation unit is implemented via at least one processor.

14. The information processing apparatus according to claim 13, wherein
the control unit sets the binocular vision region having a width corresponding to a convergence angle of both eyes of the user viewing the object.

15. The information processing apparatus according to claim 13, wherein
the control unit sets the binocular vision region having a width corresponding to a position of the object in the depth direction represented by the position information.

16. The information processing apparatus according to claim 13, wherein
the image generation unit generates an image that varies according to the object, as the predetermined image.

17. The information processing apparatus according to claim 13, wherein
the image generation unit generates an image obtained by changing luminance of the object, as the predetermined image.

18. The information processing apparatus according to claim 13, wherein
the image generation unit generates an image obtained by changing at least one of chromaticity or saturation of the object, as the predetermined image.

19. An information processing method comprising, by an information processing apparatus:
outputting a left-eye image and a right-eye image to acquire position information of an object in a depth direction to be perceived by a user; and
setting a luminance correction region to be subjected to luminance correction to at least one of a first display region that is included in a display region for the left-eye image and overlaps a display region for the right-eye image, or a second display region that is included in the display region for the right-eye image and overlaps the display region for the left-eye image on a basis of the position information,
wherein the luminance correction region is set to a binocular vision region having a width corresponding to a position of the object.

20. A non-transitory computer-readable storage medium having embodied thereon a program, which when executed by a computer causes the computer to execute a method, the method comprising:
outputting a left-eye image and a right-eye image to acquire position information of an object in a depth direction to be perceived by a user; and
setting a luminance correction region to be subjected to luminance correction to at least one of a first display region that is included in a display region for the left-eye image and overlaps a display region for the right-eye image, or a second display region that is included in the display region for the right-eye image and overlaps the display region for the left-eye image on a basis of the position information,
wherein the luminance correction region is set to a binocular vision region having a width corresponding to a position of the object.

* * * * *